United States Patent
Kawamura et al.

(10) Patent No.: US 11,277,542 B2
(45) Date of Patent: Mar. 15, 2022

(54) INFORMATION PROCESSING SYSTEM THAT IS IMPROVED IN CONVENIENCE OF USER OPERATION IN AUTHENTICATION PROCESSING, INFORMATION PROCESSING APPARATUS, RESPECTIVE METHODS OF CONTROLLING INFORMATION PROCESSING SYSTEM AND INFORMATION PROCESSING APPARATUS, AND STORAGE MEDIUM

(71) Applicant: CANON KABUSHIKI KAISHA, Tokyo (JP)

(72) Inventors: Nobuhiro Kawamura, Nagareyama (JP); Yusuke Kimura, Kokubunji (JP); Hiroya Igarashi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 16/821,344

(22) Filed: Mar. 17, 2020

(65) Prior Publication Data
US 2020/0314287 A1    Oct. 1, 2020

(30) Foreign Application Priority Data
Mar. 29, 2019 (JP) .............................. JP2019-067705

(51) Int. Cl.
*G06F 3/12* (2006.01)
*H04N 1/44* (2006.01)
*G06F 21/33* (2013.01)

(52) U.S. Cl.
CPC ........... *H04N 1/4433* (2013.01); *G06F 21/33* (2013.01); *H04N 1/444* (2013.01); *H04N 1/4413* (2013.01)

(58) Field of Classification Search
CPC ............. G06F 321/33; H04N 1/00435; H04N 1/00506; H04N 1/00623; H04N 1/4413; H04N 1/444; H04N 2201/0094
(Continued)

(56) References Cited

U.S. PATENT DOCUMENTS 8,701,206 B2    4/2014  Yamada
2017/0034369 A1*  2/2017  Iwashima ............. G06F 3/1257
(Continued)

FOREIGN PATENT DOCUMENTS

JP        5728275 B2    6/2015
JP     2018086766 A     6/2018

*Primary Examiner* — Gabriel I Garcia
(74) *Attorney, Agent, or Firm* — Rossi, Kimms & McDowell LLP

(57) ABSTRACT

A multi-function peripheral and an information processing apparatus are capable of communicating with each other. In one authentication setting of the information processing apparatus, functions restricted in use are disabled from being set. In another authentication setting of the information processing apparatus, when an operation on a function restricted in use is performed on a screen associated with functions of the multi-function peripheral, the information processing apparatus displays an authentication screen to cause the multi-function peripheral to execute an authentication process based on information input via the authentication screen, and if a result of the authentication process transmitted from the multi-function peripheral indicates that the authentication is successful, the screen is controlled to receive the operation on the function from the user.

12 Claims, 23 Drawing Sheets

(58) Field of Classification Search
USPC .......................................... 358/1.1–1.18, 474
See application file for complete search history.

(56) References Cited

U.S. PATENT DOCUMENTS

| | | | |
|---|---|---|---|
| 2017/0279974 A1* | 9/2017 | Mondo | ................ H04N 1/0023 |
| 2018/0152572 A1 | 5/2018 | Yano | |
| 2020/0302714 A1* | 9/2020 | Matsui | ..................... G07C 9/28 |

* cited by examiner

| SHEET ID | NAME OF SHEET | BASIS WEIGHT | SIZE | WIDTH | HEIGHT | SURFACE PROPERTY | FEATURE | COLOR | FAVORITES | ... |
|---|---|---|---|---|---|---|---|---|---|---|
| 1 | SHEET A | 216 | A4 | 297 | 210 | FINE QUALITY PAPER | NONE | WHITE | REGULAR CUSTOMER A COMPANY | ... |
| 2 | SHEET B | 148 | A4 | 297 | 210 | FINE QUALITY PAPER | INDEX SHEET | YELLOW | NONE | ... |
| 3 | SHEET C | 90 | 11x17 | 279.4 | 431.8 | RECYCLED PAPER | NONE | WHITE | REGULAR CUSTOMER C COMPANY | ... |
| 4 | SHEET D | 90 | A3 | 297 | 420 | MAT-COATED PAPER | NONE | WHITE | REGULAR CUSTOMER B COMPANY | ... |
| 5 | SHEET E | 350 | A3 | 297 | 420 | EMBOSSED PAPER | NONE | WHITE | NONE | ... |
| ... | ... | ... | ... | ... | ... | ... | ... | ... | ... | ... |

| NAME | BASIS WEIGHT | SIZE | Y (WIDTH) | X (HEIGHT) | SURFACE PROPERTY | FEATURE | COLOR | SHEET FIBER DIRECTION SETTING | 2ND SIDE PRINT DOUBLE-SIDED PRINT | OTHER ADJUSTMENT |
|---|---|---|---|---|---|---|---|---|---|---|
| Mohawk color Copy 250gsm | 250 | A4 | 11.69 | 8.27 | FINE QUALITY PAPER | NONE | WHITE | OFF | NOT SET | ADJUSTED |
| Mohawk color Copy Premi... | 105 | A4 | 11.69 | 8.27 | FINE QUALITY PAPER | NONE | WHITE | OFF | NOT SET | NOT ADJUSTED |
| International Paper Hamm... | 90 | A4 | 11.69 | 8.27 | FINE QUALITY PAPER | PUNCHED SHEET | WHITE | OFF | NOT SET | NOT ADJUSTED |
| International Paper Hamm... | 75 | A4 | 11.69 | 8.27 | FINE QUALITY PAPER | NONE | WHITE | OFF | NOT SET | NOT ADJUSTED |
| 1 Mohawk Color Copy Pre... | 105 | A3 | 16.54 | 11.69 | FINE QUALITY PAPER | NONE | WHITE | OFF | NOT SET | NOT ADJUSTED |
| Domtar Cougar Digital Col... | 176 | A4 | 11.69 | 8.27 | FINE QUALITY PAPER | NONE | WHITE | OFF | NOT SET | NOT ADJUSTED |
| Mohawk Color Copy 100%... | 105 | A3 | 16.54 | 11.69 | RECYCLED PAPER | NONE | WHITE | PARALLEL TO LONG SIDE | NOT SET | NOT ADJUSTED |
| Boise Aspen 30% Recycled... | 75 | A4 | 11.69 | 8.27 | RECYCLED PAPER | NONE | WHITE | OFF | NOT SET | NOT ADJUSTED |
| Sappi McCoy Gloss Digital ... | 118 | 11x17 | 11.00 | 17.00 | BOTH-SURFACE COATED PAPER | NONE | YELLOW | OFF | NOT SET | ADJUSTED |
| Verso Sterling Premium M... | 216 | 11x17 | 11.00 | 17.00 | MAT-COATED PAPER | NONE | WHITE | OFF | SET | NOT ADJUSTED |
| Mohawk Options Navajo Br... | 90 | 12x18 | 12.00 | 18.00 | EMBOSSED PAPER | NONE | WHITE | OFF | NOT SET | NOT ADJUSTED |
| Mohawk LOOP INXWELL V... | 298 | A4 | 11.69 | 8.27 | FINE QUALITY PAPER | NONE | YELLOW | OFF | NOT SET | NOT ADJUSTED |
| Moihawk Premium Polyeste... | 260 | A4 | 11.69 | 8.27 | FILM | NONE | WHITE | OFF | NOT SET | NOT ADJUSTED |
| Kernow Hydroprint Matt W... | 193 | LGL | 8.50 | 14.00 | SINGLE-SURFACE COATED PAPER | NONE | WHITE | OFF | NOT SET | NOT ADJUSTED |
| GPA White Semi-Gloss wit... | 216 | LGL | 8.50 | 14.00 | FINE QUALITY PAPER | INDEX SHEET | WHITE | OFF | NOT SET | NOT ADJUSTED |
| Finch Fine Color Copy (24 ... | 90 | LTR | 11.00 | 8.50 | FINE QUALITY PAPER | INDEX SHEET | WHITE | OFF | NOT SET | NOT ADJUSTED |
| Holmberg DOCU COPY CO... | 199 | A4 | 11.69 | 8.27 | FINE QUALITY PAPER | NONE | WHITE | OFF | NOT SET | NOT ADJUSTED |
| Holmberg DOCU COPY CO... | 163 | LTR | 11.00 | 8.50 | FINE QUALITY PAPER | NONE | OTHER | OFF | NOT SET | NOT ADJUSTED |
| GTI Paper USA ASPIRE Pet... | 266 | B5 | 10.12 | 7.17 | BOTH-SURFACE COATED PAPER | NONE | WHITE | PARALLEL TO LONG SIDE | NOT SET | NOT ADJUSTED |
| International Paper Color c... | 271 | A4 | 11.69 | 8.27 | FINE QUALITY PAPER | NONE | WHITE | OFF | NOT SET | NOT ADJUSTED |

FIG. 13C

NEWLY REGISTER/EDIT — 1340, 1341

*NAME: Mondi Color Copy 350gsm — 1346

*BASIS WEIGHT: 350 g/m² — 1347  COLOR: WHITE — 1348

*SURFACE PROPERTY: FINE QUALITY PAPER — 1349

*SIZE: 13x19 — 1350  
X: mm (182.0~762.0)  INCHES  
Y: mm (139.7~330.2)  
— 1351

*FEATURE: NONE — 1352

*FIBER DIRECTION SETTING OF SHEET: OFF — 1353

SECOND SIDE OF DOUBLE-SIDED PRINT:
- ● NOT SET
- ○ SET

FAVORITES: — 1355
- ☐ ① FAVORITE 1
- ☐ ② FAVORITE 2
- ☐ ③ FAVORITE 3

REGISTER/EDIT... — 1356

* indicates essential input items.

— 1354

| ADJUSTMENT: | 1342 | DISPLAY GROUP: ALL — 1343 |
|---|---|---|
| ADJUSTMENT ITEMS | ADJUSTED/NOT ADJUSTED | DISPLAY GROUP |
| GLOSS/BLACK GRADE ADJUSTMENT | ADJUSTED | IMAGE QUALITY |
| SECONDARY TRANSFER VOLTAGE ADJUSTMENT | ADJUSTED | IMAGE QUALITY |
| FRONT END SECONDARY TRANSFER VOLTAGE ADJUSTMENT | NOT ADJUSTED | IMAGE QUALITY |
| TRAILING END WHITE VOID CORRECTION | NOT ADJUSTED | IMAGE QUALITY |
| SECONDARY TRANSFER STATIC ELIMINATION BIAS ADJUSTMENT | NOT ADJUSTED | IMAGE QUALITY |
| ITB IMAGE REMOVAL ADJUSTMENT | NOT ADJUSTED | IMAGE QUALITY |
| TONER AMOUNT ADJUSTMENT MODE | NOT ADJUSTED | IMAGE QUALITY |
| PRIMARY TRANSFER VOLTAGE ADJUSTMENT | NOT ADJUSTED | IMAGE QUALITY |
| IMAGE POSITION ADJUSTMENT | NOT ADJUSTED | IMAGE POSITION |
| LEADING END/TRAILING END MARGIN ADJUSTMENT | NOT ADJUSTED | IMAGE POSITION |
| SECONDARY TRANSFER BELT SPEED ADJUSTMENT | NOT ADJUSTED | IMAGE POSITION |
| ADJUSTMENT OF QUANTITY OF AIR SUPPLIED BY SHEET FAN | NOT ADJUSTED | SHEET CONVEYANCE |
| SHEET CONVEYANCE ADJUSTMENT FOR DOUBLE-SIDED PRINT | NOT ADJUSTED | SHEET CONVEYANCE |
| SHEET CONVEYANCE ADJUSTMENT FOR PRE-FIXING CONVEYING SECTION | NOT ADJUSTED | SHEET CONVEYANCE |
| SHEET CONVEYANCE ADJUSTMENT FOR FIRST FIXING SECTION | NOT ADJUSTED | SHEET CONVEYANCE |
| SHEET CONVEYANCE ADJUSTMENT FOR SECOND FIXING SECTION | NOT ADJUSTED | SHEET CONVEYANCE |
| SHEET CONVEYANCE ADJUSTMENT FOR BYPASS SECTION | NOT ADJUSTED | SHEET CONVEYANCE |
| SHEET CONVEYANCE ADJUSTMENT FOR INVERSION/DISCHARGE SECTION | NOT ADJUSTED | SHEET CONVEYANCE |

OK — 1344    CANCEL — 1345

| BUTTON ID | NAME OF BUTTON | AUTHENTICATION CONTROL |
|---|---|---|
| PL01 | NEWLY REGISTER | YES |
| PL02 | DUPLICATE | YES |
| PL03 | REGISTER FROM DATABASE | YES |
| PL04 | EDIT | YES |
| PL05 | DELETE | YES |
| PL06 | CLOSE | NO |
| ... | ... | ... |

FIG. 19A

SHEET CASSETTE 1

SHEET LIST : 1901 [DISPLAY ALL ▼]  1907  1908 [SEARCH FOR SHEET ▼]

| NAME | BASIS WEIGHT | SIZE | Y (WIDTH) | X |
|---|---|---|---|---|
| 01_International Paper Ha... | 105 | A4R | 210.0 | 29 |
| 04_Canon USA Coated Two... | 148 | A3 | 297.0 | 42 |
| 05_Sappi McCoy Gloss Digit... | 118 | A4 | 297.0 | 21 |
| 07_Hmberg DOCU COPY ... | 163 | A3 | 297.0 | 42 |
| 08_Mohawk Color Copy Per... | 120 | A4 | 297.0 | 21 |
| 09_International Paper Spri... | 200 | A3 | 297.0 | 42 |
| 10_Avery Glossy White Pac... | 216 | A4 | 297.0 | 21 |
| 11_Mohawk Options r-Tone... | 216 | A4 | 297.0 | 21 |
| 12_Sappi Pass Gloss Digita... | 216 | A4 | 297.0 | 21 |
| 13_Canon USA Coated Two... | 216 | A4 | 297.0 | 21 |
| 14_Sappi Opus Gloss Digita... | 270 | A4 | 297.0 | 21 |
| 15_Canon USA Coated 2 s... | 216 | A4 | 297.4 | 21 |
| 16_Boise Aspen 30% Recyc... | 75 | A4 | 297.0 | 21 |
| 30_Mohawk Color Copy Pre... | 105 | LTR | 210.0 | 29 |
| 01_International Paper Ha... | 105 | A4R | 0.0 | 0 |
| INDEX SHEET 1 (151~180g/m...) | 163 | A3 | 297.0 | 42 |
| A3 TEST SHEET | 100 | A3 | 297.0 | 21 |
| A4R TEST SHEET | 100 | A4R | 210.0 | 29 |
| 17_Mohawk Color Copy 100... | 105 | A4 | 297.0 | 21 |
| 31_International Paper Ha... | 90 | A4 | 297.0 | 21 |
| 35_International Paper Ha... | 75 | A4 | 297.0 | 21 |
| 40_Canon USA Coated 2 su... | 216 | A4 | 297.0 | 21 |
| 47_International Paper Col... | 162 | A4 | 297.0 | 21 |
| A3 PLAIN PAPER | 80 | A3 | 297.0 | 42 |
| def | 90 | A4 | 297.0 | 21 |

SHEET INFORMATION — 1902

NAME :
01_International Paper Hammermill Photo White (28 Lb.Bond)

IMAGE POSITION ADJUSTMENT :
NOT ADJUSTED  [ADJUST...]

SECONDARY TRANSFER VOLTAGE ADJUSTMENT :
NOT ADJUSTED  [ADJUST...]

CURL CORRECTION AMOUNT :  1903
NOT ADJUSTED  [ADJUST...]

GLOSS/BLACK GRADE ADJUSTMENT :
ADJUSTED  [ADJUST...]

TRAILING END WHITE VOID CORRECTION :
NOT ADJUSTED  [ADJUST...]

SADDLE-STITCH SETTING :
ADJUSTED  [ADJUST...]

ADJUSTMENT OF QUANTITY OF AIR SUPPLIED BY SHEET FAN :
ADJUSTED  [ADJUST...]

1904 — [DETAILED ADJUSTMENT...]  1906

1905 — [OK]  [CANCEL]

FIG. 20

| SHEET CASSETTE 1 | | | | | |
|---|---|---|---|---|---|
| SHEET LIST | DISPLAY ALL ▽ | SEARCH FOR SHEET ▽ | | | |
| NAME | BASIS WEIGHT | SIZE | Y (WIDTH) | X | |
| 01_International Paper He... | 105 | A4R | 210.0 | 297 | |
| 04_Canon USA Coated Two... | 140 | A3 | 297.0 | 42 | |
| 06_Sappi McCoy Gloss Digit... | 118 | A4 | 297.0 | 21 | |
| 07_Holmberg DOCU COPY... | 163 | A3 | 297.0 | 42 | |
| 08_Mohawk Color Copy Per... | 120 | A4 | 297.0 | 21 | |
| 09_International Paper Spri... | 200 | A4 | 297.0 | 21 | |
| 10_Avery Glossy White Pa... | 105 | A4 | 297.0 | 21 | |
| 11_Mohawk Options i-Tone... | 216 | A4 | 297.0 | 21 | |
| 12_Sappi Potus Gloss Digita... | 216 | A4 | 297.0 | 21 | |
| 13_Canon USA Coated Two... | 216 | A4 | 297.0 | 21 | |
| 14_Sappi Opus Gloss Digita... | 270 | A4 | 297.0 | 21 | |
| 15_Canon USA Coated 2 si... | 216 | A4 | 297.0 | 21 | |
| 16_Boise Aspen 30% Recyc... | 75 | A4 | 297.4 | 21 | |
| 30_Mohawk Color Copy Pre... | 105 | LTR | 210.0 | 29 | |
| 01_International Paper Ha... | 105 | A4R | 0.0 | 0 | |
| INDEX SHEET 1 (151~180g/m...) | 166 | | | | |
| A3 TEST SHEET | 100 | A3 | 297.0 | 42 | |
| A4R TEST SHEET | 100 | A4R | 210.0 | 29 | |
| 17_Mohawk Color Copy 100... | 105 | A4 | 297.0 | 21 | |
| 31_International Paper Ha... | 90 | A4 | 297.0 | 21 | |
| 35_International Paper Ha... | 75 | A4 | 297.0 | 21 | |
| 40_Canon USA Coated 2 si... | 216 | A4 | 297.0 | 21 | |
| 47_International Paper Col... | 162 | A4 | 297.0 | 21 | |
| A3 PLAIN PAPER | 80 | A3 | 297.0 | 42 | |
| def | 90 | A4 | 297.0 | 21 | |

SHEET INFORMATION
NAME :
01_International Paper Hammermill Photo White (28 Lb.Bond) — 1902

IMAGE POSITION ADJUSTMENT : — 2001
NOT ADJUSTED    [ADJUST..]

SECONDARY TRANSFER VOLTAGE ADJUSTMENT :
NOT ADJUSTED    [ADJUST..]

CURL CORRECTION AMOUNT :
NOT ADJUSTED    [ADJUST..]

GLOSS/BLACK GRADE ADJUSTMENT :
ADJUSTED    [ADJUST..]

TRAILING END WHITE VOID CORRECTION :
NOT ADJUSTED    [ADJUST..]

SADDLE-STITCH SETTING :
ADJUSTED    [ADJUST..]

ADJUSTMENT OF QUANTITY OF AIR SUPPLIED BY SHEET FAN :
ADJUSTED    [ADJUST..] — 1906

1904 — [DETAILED ADJUSTMENT..]

1905 — [OK]    [CANCEL]

2000

INFORMATION PROCESSING SYSTEM THAT IS IMPROVED IN CONVENIENCE OF USER OPERATION IN AUTHENTICATION PROCESSING, INFORMATION PROCESSING APPARATUS, RESPECTIVE METHODS OF CONTROLLING INFORMATION PROCESSING SYSTEM AND INFORMATION PROCESSING APPARATUS, AND STORAGE MEDIUM

BACKGROUND OF THE INVENTION

Field of the Invention

The present invention relates to an information processing system that is improved in convenience of a user operation in authentication processing, an information processing apparatus, respective methods of controlling the information processing system and the information processing apparatus, and a storage medium, and more particularly to an information processing system including an information processing apparatus that is connected to a multi-function peripheral to manage the functions of the multi-function peripheral, an information processing apparatus, respective methods of controlling the information processing system and the information processing apparatus, and a storage medium.

Description of the Related Art

In a production print market, an image forming apparatus capable of handling various sheets, such as thin paper, cardboard paper, coated paper, and film, is used. The image forming apparatus of this type adds various pieces of information, such as a name, a size, and a basis weight, to sheet information of each of sheets, to thereby make it possible to identify each sheet, manage the sheets using a sheet list, and set sheet feeders.

Further, the sheet information includes not only the basic attributes, such as a name, a size, and a basis weight, but also adjustment attributes, such as a transfer voltage and an adjustment value for an image position, which make it possible to perform printing on a sheet under optimum conditions for the sheet so as to ensure higher image quality and print accuracy. The image forming apparatus used for production printing has a wide variety of adjustable items, and hence it takes time and effort to set a desired adjustment item to an optimum value. To save the user from the time and effort so as to improve the convenience of use, there has been proposed an information processing apparatus that is connected to an image forming apparatus having a large number and wide variety of functions (hereinafter referred to as the "multi-function peripheral") and enables a user to remotely intuitively operate the large number and wide variety of functions (see e.g. Japanese Laid-Open Patent Publication (Kokai) No. 2018-86766).

On the other hand, the management of sheets in the image forming apparatus directly influences the quality of a print product, and hence the management of sheets in the image forming apparatus is sometimes permitted only to a specific user, such as a system administrator. That is, there is a case where some of the functions of the image forming apparatus are restricted in use. In a case where a user intends to use such a function, an authentication screen is displayed on a console section of the image forming apparatus, and the user is required to perform authentication to prove that the user is a system administrator. In this connection, there has been proposed an image forming apparatus that controls the use of functions such that, if a user is not authenticated as a system administrator, the user is not permitted to use functions of which the use is limited (see e.g. Japanese Patent No. 5728275).

However, there is a case where a user operates a function, restricted in use, of the image forming apparatus described in Japanese Patent No. 5728275, from the information processing apparatus described in Japanese Laid-Open Patent Publication (Kokai) No. 2018-86766. In this case, unless this operation is subject to any restriction, there is a possibility of causing a problem that the quality of a print product is influenced as mentioned above.

More specifically, for example, the following two restrictions are envisaged: One is that when the above-mentioned operation is performed from the information processing apparatus, authentication of the system administrator is required via the console section included in the information processing apparatus, and the other is that, to make the operation impossible, the information processing apparatus indiscriminately disables user operations on functions, of which the use is limited, of the image forming apparatus (multi-function peripheral) which is external thereto.

In the case of the former restriction, if the authentication is successful, the user is enabled to operate the function restricted in use on the multi-function peripheral, from the information processing apparatus. This provides an advantage to a user having an operation authority, such as a system administrator, in that the number of adjustment items, which can be set from the information processing apparatus, of the multi-function peripheral is increased. On the other hand, it is troublesome for users without the operation authority in that that the authentication screen is displayed whenever each user erroneously operates the function of which the use is limited from the information processing apparatus.

On the other hand, the latter restriction has an advantage that it is possible to prevent a user not having the operation authority of the function, restricted in use, of the multi-function peripheral, from erroneously operating the above-mentioned function from the information processing apparatus side. Further, it is possible to eliminate troublesomeness caused by display of the authentication screen occurring whenever the operation instruction is given from the information processing apparatus. However, there is a problem that even in a case where a user has the operation authority, such as a case where the user is a system administrator, the user becomes incapable of setting the adjustment items of the multi-function peripheral, of which the use is limited, of the multi-function peripheral, from the information processing apparatus.

Further, from another point of view, in a case where the use of some of the functions of the multi-function peripheral is limited, if the user follows the use restriction of the information processing apparatus, the user becomes incapable of setting the desired adjustment items of the multi-function peripheral to the optimum values, which can cause lowering of the convenience of users. That is, it is not always correct to follow the use restriction of the multi-function peripheral, on the information processing apparatus.

Therefore, which of the above-mentioned restrictions is higher in convenience for a user is different depending on a user's usage environment of the information processing apparatus.

For example, in a case where the frequency of operating the function of the multi-function peripheral from the information processing apparatus is almost the same between users having the operation authority and users not having the operation authority, the convenience is higher in the case where the authentication screen is displayed as in the case of the former restriction. Further, for example, in a case where users not having the operation authority more frequently operate the function of the multi-function peripheral from the information processing apparatus, the convenience is higher in the case of the latter restriction. Further, on the other hand, in a case where only users having the operation authority operate the function of the multi-function peripheral from the information processing apparatus, the convenience is higher when the users are permitted to operate all functions of the multi-function peripheral without authentication.

SUMMARY OF THE INVENTION

The present invention provides an information processing system capable of improving the convenience when a user operates a function, restricted in use, from an information processing apparatus, respective methods of controlling the information processing system and the information processing apparatus, and a storage medium.

In a first aspect of the present invention, there is provided an information processing system including a multi-function peripheral and an information processing apparatus that manages functions of the multi-function peripheral, the multi-function peripheral and the information processing apparatus being capable of communicating with each other, wherein the multi-function peripheral comprises an authentication unit configured to execute an authentication process for receiving administrator information from the information processing apparatus, performing authentication based on the received administrator information, and transmitting a result of the authentication to the multi-function peripheral, and wherein the information processing apparatus comprises an identification unit configured to identify, from operation items on a screen associated with the functions of the multi-function peripheral, an operation item requiring the authentication process for operation thereof, a first control unit configured to control the screen to inhibit receiving an operation on the identified operation item from a user, in a case where an authentication setting for disabling setting of the identified operation item has been set in the information processing apparatus, and a second control unit configured to control the screen to display, in a case where an authentication setting for executing the authentication process when an operation on the identified operation item is performed has been set in the information processing apparatus, an authentication screen when an operation on the identified operation item is performed, send an inquiry about the administrator information input by the user via the displayed authentication screen to the multi-function peripheral to cause the multi-function peripheral to execute the authentication process, and receive an operation on the identified operation item from the user, in a case where a result of the authentication process transmitted from the multi-function peripheral indicates that the authentication is successful.

In a second aspect of the present invention, there is provided an information processing apparatus that is capable of communicating with a multi-function peripheral and manages functions of the multi-function peripheral, comprising an authentication unit configured to send an inquiry about administrator information to the multi-function peripheral to cause the multi-function peripheral to execute an authentication process, an identification unit configured to identify, from operation items on a screen associated with the functions of the multi-function peripheral, an operation item requiring the authentication process for operation thereof, a first control unit configured to control the screen to inhibit receiving an operation on the identified operation item from a user, in a case where an authentication setting for disabling setting of the identified operation item has been set in the information processing apparatus, and a second control unit configured to control the screen to display, in a case where an authentication setting for causing the authentication unit to operate when an operation on the identified operation item is performed has been set in the information processing apparatus, an authentication screen when an operation on the identified operation item is performed, cause the authentication unit to operate when the administrator information is input by the user via the displayed authentication screen, and receive an operation on the identified operation item from the user, in a case where a result of the authentication process transmitted from the multi-function peripheral indicates that the authentication is successful.

In a third aspect of the present invention, there is provided a method of controlling an information processing system including a multi-function peripheral and an information processing apparatus that manages functions of the multi-function peripheral, the multi-function peripheral and the information processing apparatus being capable of communicating with each other, comprising causing the multi-function peripheral to execute an authentication process for receiving administrator information from the information processing apparatus, performing authentication based on the received administrator information, and transmitting a result of the authentication to the multi-function peripheral, and causing the information processing apparatus to identify, from operation items on a screen associated with the functions of the multi-function peripheral, an operation item requiring the authentication process for operation thereof, to control the screen to inhibit receiving an operation on the identified operation item from a user, in a case where an authentication setting for disabling setting of the identified operation item has been set in the information processing apparatus, to display, in a case where an authentication setting for executing the authentication process when an operation on the identified operation item is performed has been set in the information processing apparatus, an authentication screen when an operation on the identified operation item is performed, to cause the multi-function peripheral to execute the authentication process by sending an inquiry about the administrator information input by the user via the displayed authentication screen to the multi-function peripheral, and to control the screen to receive an operation on the identified operation item from the user, in a case where a result of the authentication process transmitted from the multi-function peripheral indicates that the authentication is successful.

In a fourth aspect of the present invention, there is provided a method of controlling an information processing apparatus that is capable of communicating with a multi-function peripheral and manages functions of the multi-function peripheral, comprising causing the multi-function peripheral to execute an authentication process by sending an inquiry about administrator information to the multi-function peripheral, identifying, from operation items on a screen associated with the functions of the multi-function peripheral, an operation item requiring the authentication process for operation thereof, controlling the screen to inhibit receiving an operation on the identified operation item from a user, in a case where an authentication setting for disabling setting of the identified operation item has been set in the information processing apparatus, displaying, in a case where an authentication setting for causing the multi-function peripheral execute the authentication process when an operation on the identified operation item is performed has been set in the information processing apparatus, an authentication screen when an operation on the identified operation item is performed, causing the multi-function peripheral to execute the authentication process when the administrator information is input by the user via the displayed authentication screen, and controlling the screen to receive an operation on the identified operation item from the user, in a case where a result of the authentication process transmitted from the multi-function peripheral indicates that the authentication is successful.

According to the present invention, it is possible to improve the convenience when a user operates a function restricted in use.

Further features of the present invention will become apparent from the following description of exemplary embodiments (with reference to the attached drawings).

BRIEF DESCRIPTION OF THE DRAWINGS

FIG. 4 is a diagram showing an example of a top screen of a sheet management application executed by the print control apparatus.

FIG. 7 is a diagram showing an example of a sheet settings management table managed by a sheet management unit appearing in FIG. 3.

FIGS. 13A to 13C are diagrams useful in explaining changes of the screen when an edit button is pressed on a sheet list screen displayed by pressing a sheet list button on the top screen of the sheet management application, in a case where a first authentication setting has been set.

FIG. 14 is a diagram showing a sheet list screen displayed by pressing the sheet list button on the top screen of the sheet management application, in a case where a third authentication setting has been set.

FIG. 16 is a diagram showing an example of a login control object table.

FIGS. 19A to 19C are diagrams showing changes of the screen when an adjustment button is pressed on a sheet feeder screen displayed by pressing a sheet feeder button on the top screen of the sheet management application, in a case where a first authentication setting has been set, in a second embodiment.

FIG. 20 is a diagram showing a sheet feeder screen displayed by pressing the sheet feeder button on the top screen of the sheet management application, in a case where a third authentication setting has been set, in the second embodiment.

DESCRIPTION OF THE EMBODIMENTS

The present invention will now be described in detail below with reference to the accompanying drawings showing embodiments thereof.

The embodiments described below by no means limit the present invention, and all combinations of features described in the embodiments are not necessarily essential to the solution according to the invention.

Figure 1:
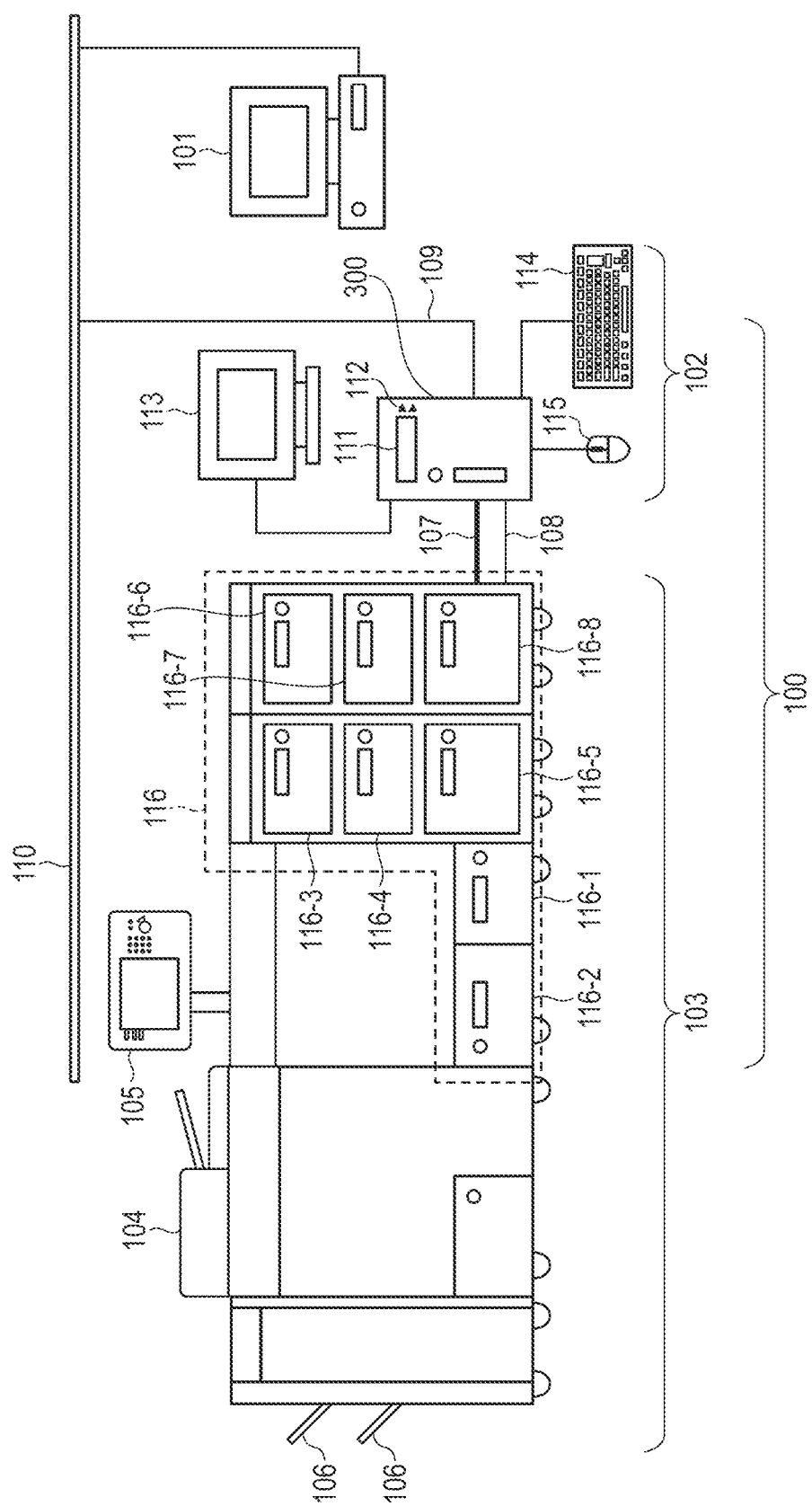
FIG. 1 is a block diagram showing the whole configuration of a print system as an information processing system according to a first embodiment.

FIG. 1 is a block diagram showing the whole configuration of a print system 100 as an information processing system according to a first embodiment.

This print system 100 includes an image forming apparatus 103 (multi-function peripheral) and a print control apparatus 102 (information processing apparatus), and is communicably connected to a client computer 101. The client computer 101 and the print control apparatus 102 are communicably connected to each other via an Ethernet cable 109 and a Local Area Network (LAN) 110. Further, the print control apparatus 102 and the image forming apparatus 103 are connected to each other via an image video cable 107 and a control cable 108.

Note that in the present embodiment, the image forming apparatus 103 is not directly connected to the LAN 110, and hence the image forming apparatus 103 and the client computer 101 communicate with each other via the print control apparatus 102. However, this is not limitative, but for example, the image forming apparatus 103 may be connected to the LAN 110. That is, the image forming apparatus 103 may be communicably and directly connected to the client computer 101. The client computer 101 starts an application to provide a print instruction or the like to the print system 100. The print control apparatus 102 performs image processing in cooperation with the image forming apparatus 103.

The image forming apparatus 103 is a multi-function peripheral having various functions, and includes a scanner 104, a console panel 105, and a sheet discharge section 106.

The image forming apparatus 103 is not only capable of performing image processing instructed from the client computer 101 and the print control apparatus 102, but also capable of copying data read from the scanner 104 and transmitting data to a BOX data storage area, referred to hereinafter.

Various instructions, such as an instruction for scanning an image using the scanner 104, are received from a user via various keys on the console panel 105. Further, the console panel 105 displays various information, such as a scan state.

The sheet discharge section 106 receives a sheet on which an image has been formed and discharges the received sheet.

The print control apparatus 102 includes a controller 300, and a display section 111, an operation button section 112, a display device 113, a keyboard 114, and a pointing device 115, which are connected to the controller 300.

The display section 111 displays information on the print control apparatus 102. A user operates the operation button section 112 to manipulate the information displayed on the display section 111. The information displayed on the display section 111 is used for the purpose of displaying minimum information necessary for operating the print control apparatus 102 (operation on the power supply and IP address check).

In the first embodiment, the print system 100 will be described as a system formed by the print control apparatus 102 and the image forming apparatus 103 as separate units. However, the processing performed by the print control apparatus 102 may be performed by the image forming apparatus 103, without physically arranging the print control apparatus 102. Further, the display device 113 may have a position input function and a character input function as equipped in a touch pad, and thereby also serve as the keyboard 114 and the pointing device 115.

The image forming apparatus 103 is further connected to sheet feed sections 116-1 to 116-8 (these are hereinafter collectively referred to as the sheet feed sections 116). The sheet feed sections 116 are devices for storing sheets for printing, and upon receipt of a print instruction, the image forming apparatus 103 selects one of the sheet feed sections 116. One of the sheet feed sections 116 selected by the image forming apparatus 103 feeds a sheet stored therein to the image forming apparatus 103. Note that the number of sheet feed sections 116 increases or decreases according to the configuration of external options connected to the image forming apparatus 103.

Figure 2:
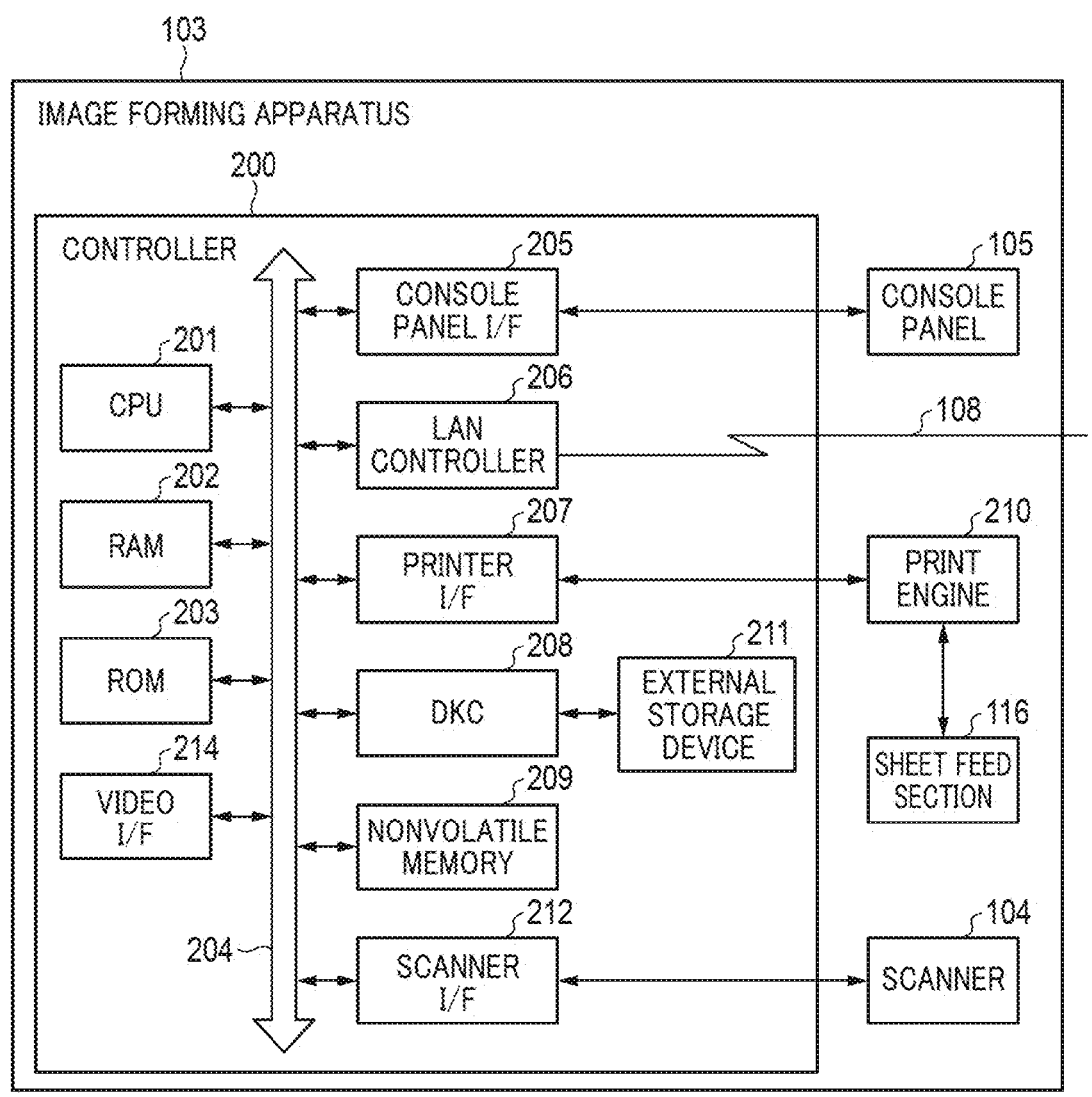
FIG. 2 is a block diagram showing a hardware configuration of an image forming apparatus as a multi-function peripheral appearing in FIG. 1.

FIG. 2 is a block diagram showing a hardware configuration of the image forming apparatus 103.

As shown in FIG. 2, the image forming apparatus 103 includes not only the above-mentioned scanner 104, console panel 105, and sheet feed sections 116, etc., but also a controller 200 and a print section (print engine) 210.

The controller 200 includes a CPU 201, a RAM 202, a ROM 203, a console panel interface (hereinafter referred to as the "console panel I/F") 205, a LAN controller 206, and a printer interface (hereinafter referred to as the "printer I/F") 207. Further, the controller 200 includes a disk controller (DKC) 208 connected to an external storage device 211, a nonvolatile memory 209, a scanner interface (hereinafter referred to as the "scanner I/F") 212, and a video interface (hereinafter referred to as the "video I/F") 214. These devices are interconnected via a system bus 204.

The CPU 201 loads control programs stored in the ROM 203 or the external storage device 211 into the RAM 202 and executes the loaded program to thereby perform centralized control of various devices connected to the system bus 204. Further, the CPU 201 outputs image signals as output information to the print section 210 connected thereto via the printer I/F 207 and receives image signals input from the scanner 104 connected thereto via the scanner I/F 212. Further, the CPU 201 controls the sheet feed sections 116 connected to the print section 210 and acquires the state (sheet feeder information) of the sheet feed sections 116, via the printer I/F 207. Further, the CPU 201 is capable of communicating with the print control apparatus 102 via the LAN controller 206 and the control cable 108.

The RAM 202 mainly functions as a main memory, a work area, etc., for the CPU 201.

The external storage device 211 is implemented by a hard disk (HDD), an IC card, or the like, and the access thereto is controlled by the DKC 208. The external storage device 211 is used for storing application programs, font data, form data, etc., and as a job storage area for temporarily spooling a print job to enable the spooled job to be controlled from the outside. Further, the external storage device 211 is also used as a BOX data storage area for storing image data input from the scanner 104 and image data of a print job, as BOX data which is referred to from a network and is printed. In the first embodiment, an HDD is used as the external storage device 211, and stores various logs, such as a job log and an image log.

The console panel 105 is a panel having software keys or hardware keys and is connected to the controller 200 via the console panel I/F 205. A user can input various information from the software keys or the hardware keys of the console panel 105.

The nonvolatile memory 209 stores information input by a user from the console panel 105, and information which is set by a user from an application started on the client computer 101 and is received by the image forming apparatus 103 via the LAN 110 and the print control apparatus 102.

The video I/F 214 receives image data from the print control apparatus 102 via the image video cable 107.

Figure 3A:
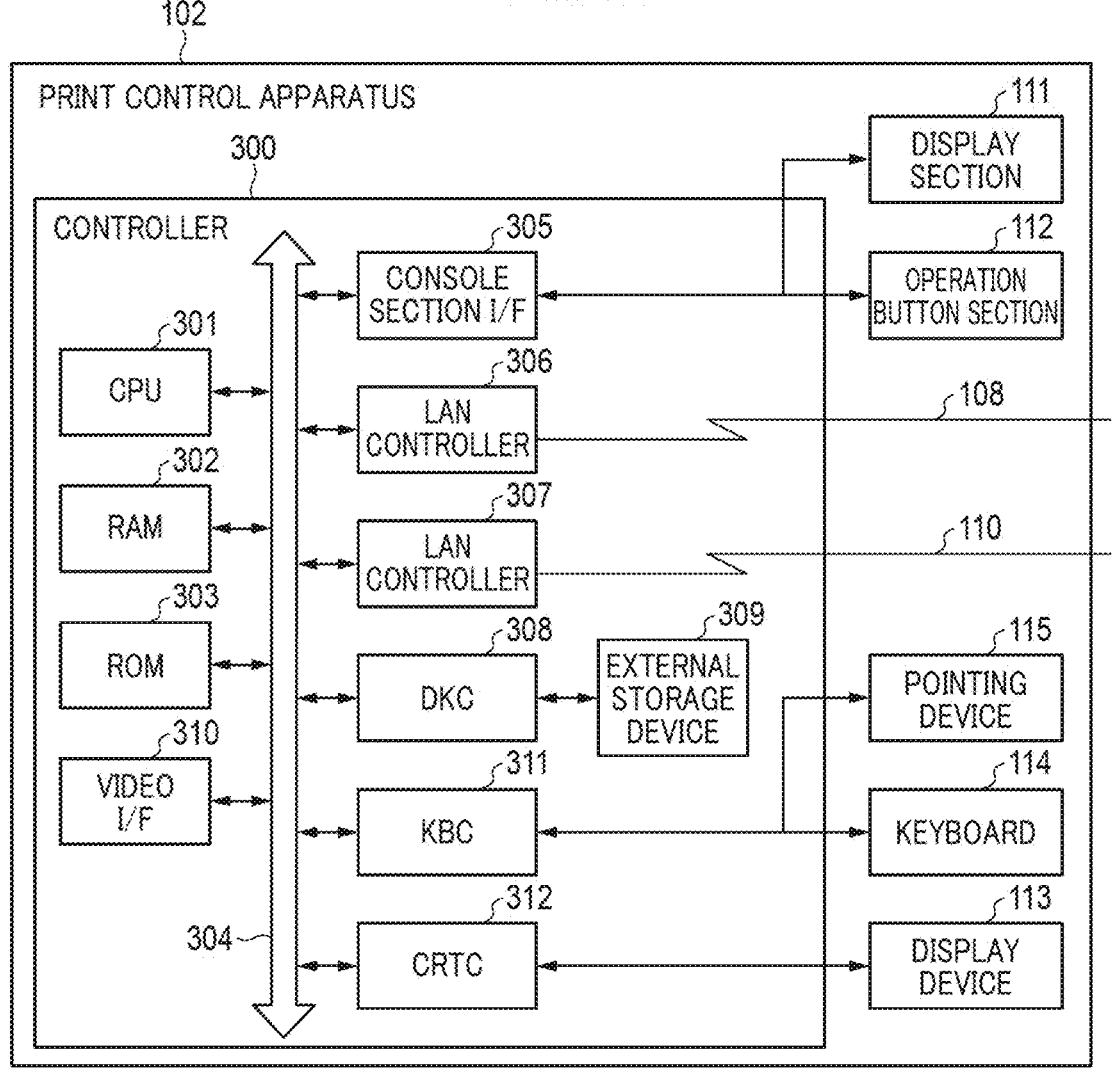
FIGS. 3A and 3B are block diagrams showing a hardware configuration and a software configuration of a print control apparatus as an information processing apparatus appearing in FIG. 1.

FIG. 3A is a block diagram showing a hardware configuration of the print control apparatus 102.

The print control apparatus 102 includes, as described above, the controller 300, the control cable 108, the LAN 110, the display section 111, the operation button section 112, the display device 113, the keyboard 114, and the pointing device 115.

The controller 300 includes a CPU 301, a RAM 302, a ROM 303, a console section I/F 305, LAN controllers 306 and 307, and a DKC 308 connected to an external storage device 309. Further, the controller 300 includes a video I/F 310, a keyboard controller (KBC) 311, and a display controller (CRTC) 312. These devices are interconnected via a system bus 304.

The CPU 301 loads control programs stored in the ROM 303 or the external storage device 309 into the RAM 302 and executes the loaded programs to thereby perform centralized control of various devices connected to the system bus 304. Further, the CPU 301 is capable of communicating with the image forming apparatus 103 via the LAN controller 306 and the control cable 108. Further, the LAN controller 307 is connected to the LAN 110 via the Ethernet cable 109, whereby the CPU 301 is enabled to communicate with the client computer 101 on the LAN 110.

The RAM 302 mainly functions as a main memory and a work area, for the CPU 301.

The external storage device 309 is implemented by a hard disk (HDD), an IC card, or the like, and the access thereto is controlled by the DKC 308. The external storage device 309 stores application programs, font data, form data, etc., and temporarily spools a print job. Further, the external storage device 309 is used as a job storage area for performing RIP (Raster Image Processor) processing on the spooled job and storing the processed job again.

The console section I/F 305 is an interface for connecting between the controller 300, and the operation button section 112 to which a user inputs a variety of information and the display section 111 for presenting information to a user.

The video I/F 310 transmits image data subjected to the RIP processing to the image forming apparatus 103 via the image video cable 107.

The KBC 311 is an interface for performing processing associated with inputting of information and so forth, from the keyboard 114 and the pointing device 115.

The CRTC 312 has an internal video memory, draws image data in the video memory according to an instruction from the CPU 301, and outputs the image data drawn in the video memory, to the display device 113 as video signals.

Figure 3B:
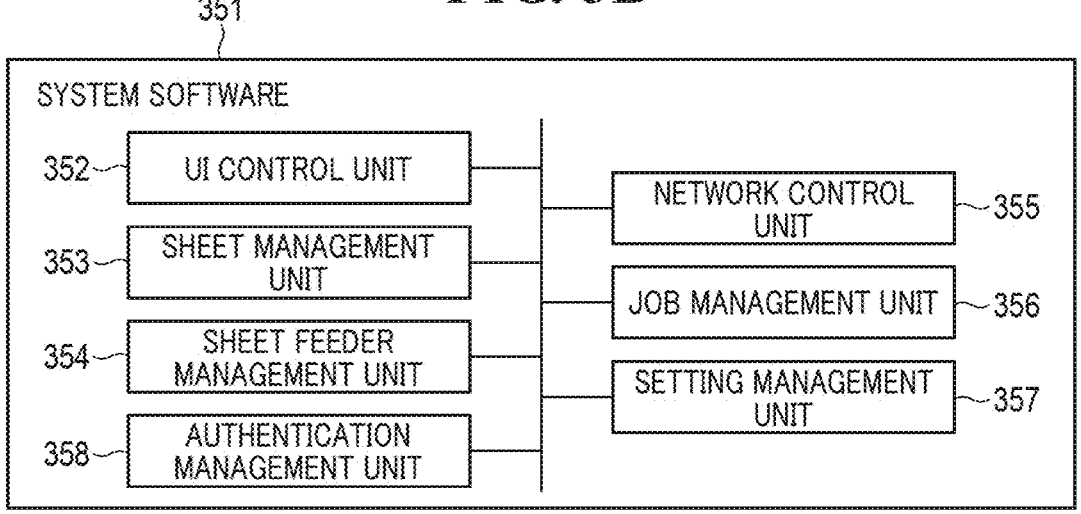

FIG. 3B is a block diagram showing a configuration of system software 351, which is executed by the print control apparatus 102, including a configuration of a sheet management application that manages the functions of the image forming apparatus 103 The units shown in FIG. 3B are realized by the CPU 301 executing the programs loaded into the RAM 302.

The sheet management application includes a U control unit 352, a sheet management unit 353, a sheet feeder management unit 354, a network control unit 355, a job management unit 356, and a setting management unit 357.

The UI control unit 352 controls a screen displayed on the display device 113 during execution of the sheet management application. Further, the UI control unit 352 switches a screen display language and a unit system of sheet sizes displayed on the display device 113.

The sheet management unit 353 communicates with the image forming apparatus 103 and manages acquired sheet information using a sheet settings management table 701, described hereinafter with reference to FIG. 7.

FIG. 7 is a diagram showing an example of the sheet settings management table 701 managed by the sheet management unit 353.

As shown in FIG. 7, the sheet settings management table 701 is a management table for managing sheets in association with sheet IDs each identifying a sheet. A name, a basis weight, size information (size, width, height, etc.), surface property, a characteristic feature, a color, a favorite, and so forth, are registered in the sheet settings management table 701 for each sheet.

The information of the favorite is used to filter the contents to be displayed in a sheet list display area 1301, described hereinafter, for each of a regular customer A company, a regular customer B company, and a regular customer C company, for example.

The sheet management unit 353 is capable of performing editing, addition, deletion, and search of sheet information, on the sheet settings management table 701.

In the present embodiment, the sheet settings management table 701 is stored in the external storage device 309 which is a nonvolatile area. However, the sheet settings management table 701 may be stored in any other storage location than the external storage device 309, insofar as the storage location can be managed by the sheet management unit 353. For example, the sheet settings management table 701 may be stored in the external storage device 211 of the image forming apparatus 103, and the print control apparatus 102 may acquire the sheet settings management table 701 from the image forming apparatus 103 and store the same in the RAM 302 only during execution of the program.

The sheet feeder management unit 354 communicates with the image forming apparatus 103 and manages acquired sheet feeder information.

The network control unit 355 controls communication with the image forming apparatus 103 via the LAN controller 306 and communication with the client computer 101 on the LAN 110 via the LAN controller 307.

The job management unit 356 manages a print process sequence and the order of jobs. The job management unit 356 manages a job received by the print control apparatus 102 and controls data transfer to the image forming apparatus 103 for printing the received job via the LAN controller 306 or the video I/F 310.

The setting management unit 357 manages system settings associated with the sheet management application. The system settings include a language setting of words to be displayed on the screen of the sheet management application, setting of a unit system (millimeter or inch) of sheet sizes, and so forth, as appearing in a setting screen 900 described hereinafter with reference to FIG. 9A.

An authentication management unit 358 controls a login control object table 1600, described hereinafter with reference to FIG. 16, for controlling whether or not to require authentication with respect to each of items of user operation executed by the sheet management application.

Figure 4:
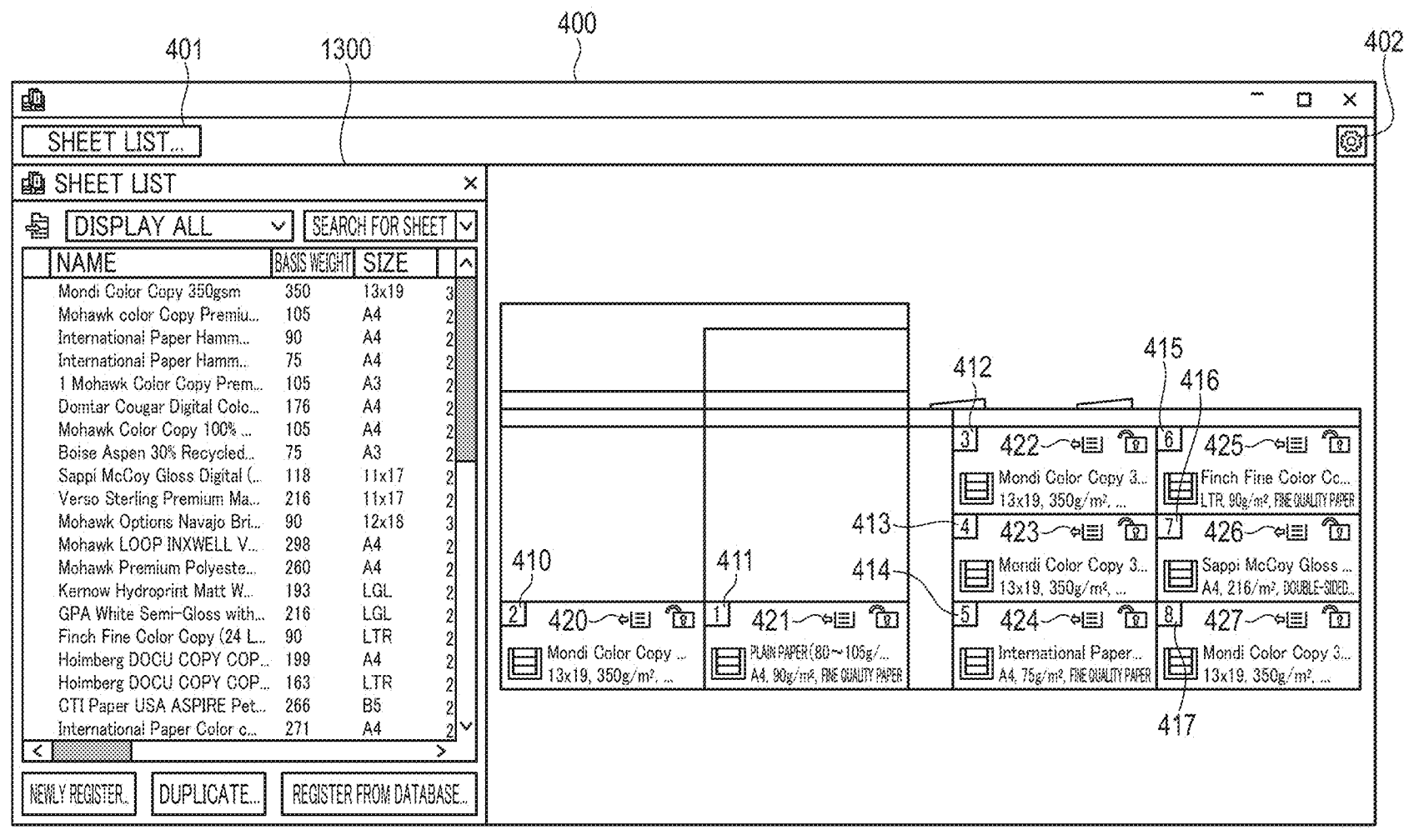

FIG. 4 is a diagram showing an example of a top screen 400 of the sheet management application executed by the print control apparatus 102.

The top screen 400 is displayed by the CRTC 312 drawing the state of the sheet feed sections 116 of the image forming apparatus 103 (sheet feeder information) in the video memory as image data according to an instruction from the CPU 301 and outputting this image data to the display device 113 as video signals. That is, when the sheet management application is started, the sheet feeder management unit 354 acquires the sheet feeder information from the image forming apparatus 103, and the UI control unit 352 controls the display device 113 to display a component devices area on the top screen 400 according to the acquired sheet feeder information.

In the present embodiment, the sheet feed sections 116 formed by eight sheet feeders are connected to the image forming apparatus 103, and hence a sheet list button 401, a configuration button 402, sheet feeder buttons 410 to 417, corresponding to the sheet feeders, respectively, and so forth are displayed on the top screen 400.

The sheet feeder buttons 410 to 417 are displayed in corners of respective associated display areas each displaying an associated one of sheet feed section open buttons 420 to 427, and information, such as the name of sheets set in an associated sheet feeder and the remaining amount of sheets.

When any of the sheet feed section open buttons 420 to 427 is pressed by a user in a state in which the associated sheet feeder is closed, the sheet feeder is opened.

When a change notification event indicating that the state of one of the sheet feeders has bene changed is transmitted from the image forming apparatus 103, the sheet feeder management unit 354 reacquires the sheet feeder information. Then, the UI control unit 352 redraws the display areas associated with the respective sheet feeder buttons 410 to 417 according to the reacquired sheet feeder information.

The sheet list button 401 is a button for providing an instruction for displaying a sheet list screen 1300. In the first embodiment, when the sheet list button 401 is pressed, the UI control unit 352 controls the display device 113 to display the sheet list screen 1300 as shown in FIG. 13A. Details of the sheet list screen 1300 will be described with reference to FIG. 13A.

The configuration button 402 is a button for providing an instruction for displaying the setting screen 900 (or a setting screen 1100) for changing the system settings of the sheet management application. When the configuration button 402 is pressed, the UI control unit 352 controls the display device 113 to display the current system settings stored in the external storage device 309 on the setting screen 900 (or the setting screen 1100). Examples of the displayed screens will be described with reference to FIGS. 9A to 9C and FIG. 11.

Figure 5:
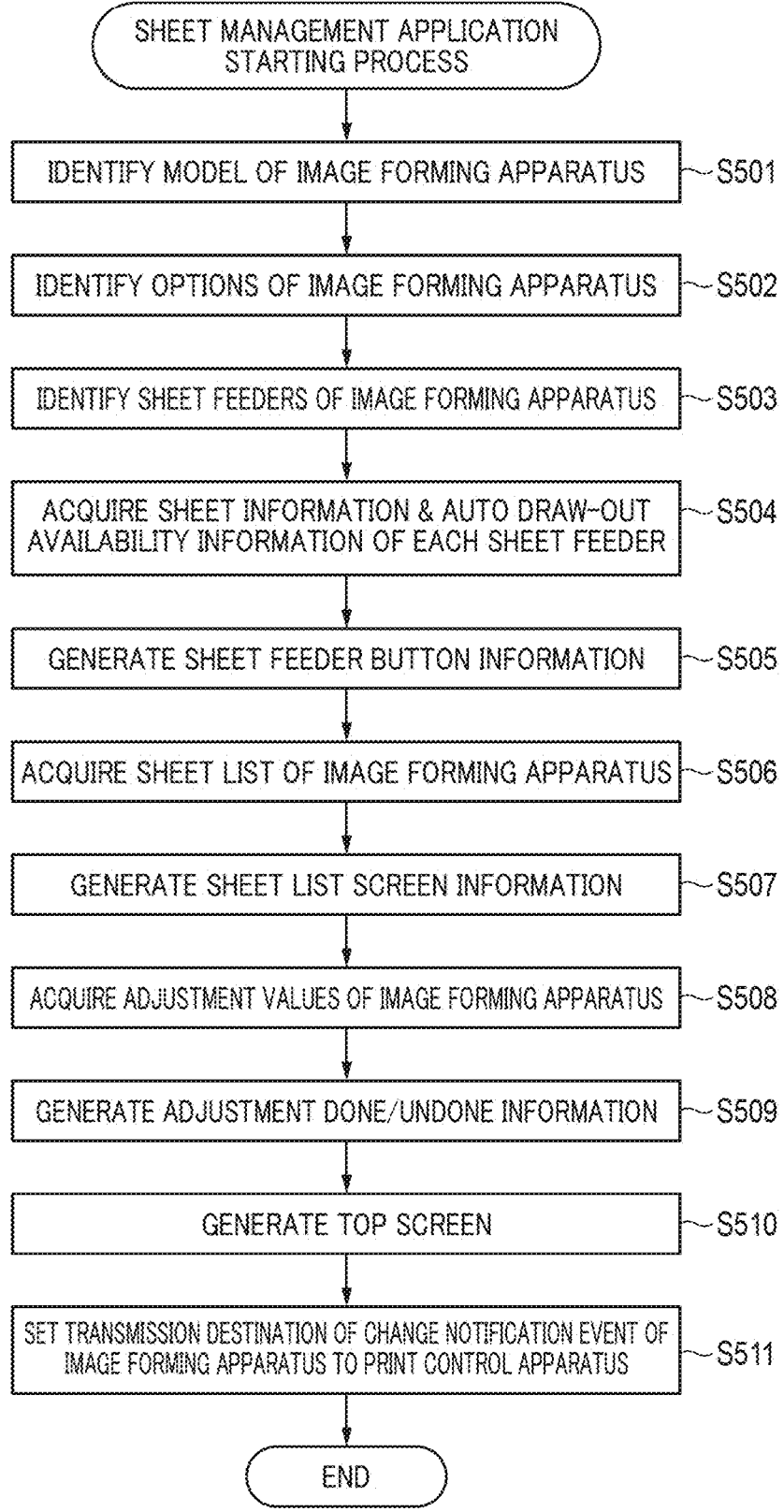
FIG. 5 is a flowchart of a process performed by the print control apparatus, for starting the sheet management application.

FIG. 5 is a flowchart of a process performed by the print control apparatus 102 for starting the sheet management application. Although the sheet management application operates on the print control apparatus 102, this is not limitative, but for example, the sheet management application can similarly operate on the client computer 101. Here, the description of the present process is given based on an example in which it is performed by the print control apparatus 102. Note that the present process is realized by the CPU 301 executing the associated program loaded into the RAM 302.

When the print control apparatus 102 is started, first, in a step S501, the CPU 301 identifies the model of the image forming apparatus 103 connected thereto, as a sheet management target. More specifically, first, the CPU 301 communicates with the image forming apparatus 103 to send an inquiry about model information and acquires the model information of the image forming apparatus 103 sent therefrom in response to this inquiry. Details of the process performed by the image forming apparatus 103 in association with this step will be described in steps S606 and S607 in FIG. 6. Further, the CPU 301 identifies the model of the image forming apparatus 103 by comparing the acquired model information with model identification information stored therein in advance. Note that the CPU 301 identifies the model of the image forming apparatus 103 and uses a result of the identification when generating the component devices area of the top screen 400, and when absorbing differences in specifications between models.

In a step S502, the CPU 301 identifies options of the image forming apparatus 103 (component devices connected to the image forming apparatus 103). More specifically, first, the CPU 301 communicates with the image forming apparatus 103 to send an inquiry about components configuration information and acquires the components configuration information of the image forming apparatus 103 sent therefrom in response to this inquiry. Details of the process performed by the image forming apparatus 103 in association with this step will be described in steps S608 and S609 in FIG. 6. Further, the CPU 301 identifies the options of the image forming apparatus 103 based on the acquired components configuration information. Note that the CPU 301 uses a result of the identification when generating the component devices area of the top screen 400, when identifying information of a sheet feeder, and further when absorbing differences in specifications between models.

In a step S503, the CPU 301 identifies the sheet feeders of the image forming apparatus 103. More specifically, first, the CPU 301 communicates with the image forming apparatus 103 to send an inquiry about sheet feeder information and acquires the sheet feeder information of the image forming apparatus 103 sent therefrom in response to this inquiry. Details of the process performed by the image forming apparatus 103 in association with this step will be described in steps S610 and S611 in FIG. 6. The sheet feeder information includes the configuration of sheet feeders, such as sheet feed cassettes, a manual feed tray, and a long sheet tray, and information on sheets set in each sheet feeder. Further, the CPU 301 identifies the sheet feeders connected to the image forming apparatus 103 as the sheet management target, based on the acquired sheet feeder information. At this time, the CPU 301 also identifies the number of the connected sheet feeders.

In a step S504, the CPU 301 acquires sheet information and automatic draw-out availability information set for each of the sheet feeders identified in the step S503, based on the sheet feeder information acquired in the step S503. Here, the automatic draw-out availability information refers to information indicating whether or not each of the sheet feeders identified in the step S503 can be automatically drawn out by a remote operation of a user from the print control apparatus 102.

In a step S505, the CPU 301 generates sheet feeder button information. Here, the sheet feeder button information refers to information for displaying the buttons (the sheet feeder buttons 410 to 417 appearing in FIG. 4) representing the sheet feeders identified in the step S503, on the top screen 400. Note that the sheet feeder button information of a sheet feeder, of the which automatic draw-out availability information acquired in the step S504 is "available", includes information that a button should be generated at a location above a display area representing the associated sheet feeder, for opening the associated sheet feeder when pressed in a closed state of the sheet feeder. Based on this information, the sheet feeder open buttons 420 to 427 are generated at respective upper portions of the areas associated with the sheet feeder buttons 410 to 417 as shown in FIG. 4.

In a step S506, the CPU 301 communicates with the image forming apparatus 103 to send an inquiry about sheet list information and acquires the sheet list information sent from the image forming apparatus 103 in response to this inquiry. Details of the process performed by the image forming apparatus 103 in association with this step will be described in steps S612 and S613 in FIG. 6.

In a step S507, the CPU 301 generates information on the sheet list screen 1300 to be displayed on the top screen 400 based on the sheet list information acquired in the step S506. Each sheet information item for the sheet list screen 1300 includes information indicating whether or not sheets can be set for sheet feeders of the image forming apparatus 103.

In a step S508, the CPU 301 acquires adjustment values of the image forming apparatus 103. More specifically, first, the CPU 301 communicates with the image forming apparatus 103 to send an inquiry about adjustment value information, and acquires the adjustment values of all items which can be adjusted in the image forming apparatus 103 from the adjustment value information sent from the image forming apparatus 103 in response to this inquiry. Details of the process performed by the image forming apparatus 103 in association with this step will be described in steps S614 and S615 in FIG. 6.

In a step S509, the CPU 301 generates adjustment done undone information based on the adjustment values acquired in the step S508. Here, the adjustment done/undone information is information for displaying "not adjusted" on the sheet list screen 1300 in a case where the adjustment value is equal to the default value and displaying "adjusted" on the sheet list screen 1300 in a case where the adjustment value is different from the default value.

In a step S510, the CPU 301 generates the top screen 400. This top screen 400 is generated based on the model and options of the image forming apparatus 103 identified in the respective steps S501 and S502, and the sheet feeder button information, the sheet list screen information, and the adjustment done/undone information, generated in the respective steps S505, S507, and S509.

In a step S511, the CPU 301 sets a transmission destination of a change notification event to be notified from the image forming apparatus 103 to the print control apparatus 102 when the sheet feeder information or the sheet information of the image forming apparatus 103 is changed. More specifically, first, the CPU 301 communicates with the image forming apparatus 103 to transmit a request for registering information on the transmission destination to which a change notification event is to be transmitted when the state of the image forming apparatus 103 is changed, and waits until information notifying that the registration is successful is sent from the image forming apparatus 103 in response to this request. Details of the process performed by the image forming apparatus 103 in association with this step will be described in steps S616 and S617 in FIG. 6. Further, when the information notifying that the registration is successful has been received, the CPU 301 determines that the setting of the transmission destination of the change notification event is completed and starts processing for waiting for a change notification event, followed by terminating the present process.

The process in FIG. 5 is described as the process for starting the sheet management application. However, the information on the image forming apparatus 103, such as the sheet feeder information, the sheet list information, and the adjustment values, can be changed any time while the sheet management application is used. Therefore, the update of the above-mentioned information performed through communication between the sheet management application and the image forming apparatus 103 is executed as required regardless of which of the sheet management application and the image forming apparatus 103 has executed the update operation. Further, the updated information is synchronized between the sheet management application and the image forming apparatus 103.

Figure 6:
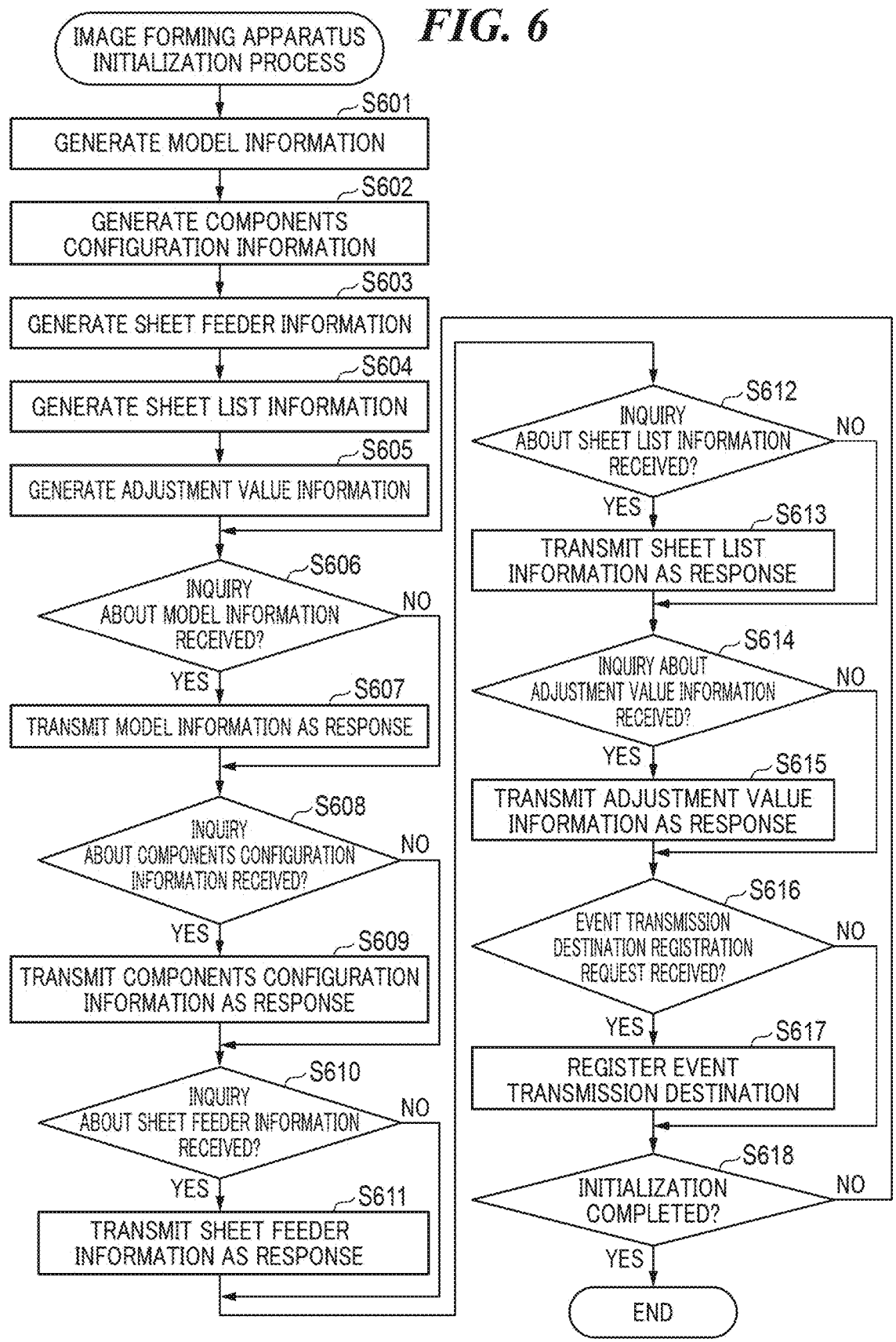
FIG. 6 is a flowchart of an initialization process performed by the image forming apparatus.

FIG. 6 is a flowchart of an initialization process performed by the image forming apparatus 103. The present process is realized by the CPU 201 executing a program loaded into the RAM 202.

First, in a step S601, the CPU 201 acquires the model information of the image forming apparatus 103 from the external storage device 211 and generates data of the model information, which can be transmitted as a response.

In a step S602, the CPU 201 acquires information (components configuration information) on the options (component devices connected to the image forming apparatus 103) of the image forming apparatus 103 from the external storage device 211 and generates data of the components configuration information, which can be transmitted as a response.

In a step S603, the CPU 201 acquires the sheet feeder information of the image forming apparatus 103 from the external storage device 211 and generates data of the sheet feeder information, which can be transmitted as a response.

In a step S604, the CPU 201 acquires the sheet list information of the image forming apparatus 103 from the external storage device 211 and generates data of the sheet list information, which can be transmitted as a response.

In a step S605, the CPU 201 acquires the adjustment value information of the image forming apparatus 103 from the external storage device 211 and generates data of the adjustment value information, which can be transmitted as a response. The adjustment value information acquired in this step includes the adjustment values of all items which can be adjusted for the image forming apparatus 103.

In the step S606, the CPU 201 determines whether or not the inquiry about the model information, transmitted from the print control apparatus 102 in the step S501 in FIG. 5, has been received. If the inquiry about the model information has been received (YES to the step S606), the CPU 201 proceeds to the step S607, transmits the model information generated in the step S601 to the print control apparatus 102 as a response, and proceeds to the step S608. On the other hand, if the inquiry about the model information has not been received (NO to the step S606), the CPU 201 directly proceeds to the step S608.

In the step S608, the CPU 201 determines whether or not the inquiry about the components configuration information, transmitted from the print control apparatus 102 in the step S502 in FIG. 5, has been received. If the inquiry about the components configuration information has been received (YES to the step S608), the CPU 201 proceeds to the step S609, transmits the components configuration information generated in the step S602 to the print control apparatus 102 as a response, and proceeds to the step S610. On the other hand, if the inquiry about the components configuration information has not been received (NO to the step S608), the CPU 201 directly proceeds to the step S610.

In the step S610, the CPU 201 determines whether or not the inquiry about the sheet feeder information, transmitted from the print control apparatus 102 in the step S503 in FIG. 5, has been received. If the inquiry about the sheet feeder information has been received (YES to the step S610), the CPU 201 proceeds to the step S611, transmits the sheet feeder information generated in the step S603 to the print control apparatus 102 as a response, and proceeds to the step S612. On the other hand, if the inquiry about the sheet feeder information has not been received (NO to the step S610), the CPU 201 directly proceeds to the step S612.

In the step S612, the CPU 201 determines whether or not the inquiry about the sheet list information, transmitted from the print control apparatus 102 in the step S506 in FIG. 5, has been received. If the inquiry about the sheet list information has been received (YES to the step S612), the CPU 201 proceeds to the step S613, transmits the sheet list information generated in the step S604 to the print control apparatus 102 as a response, and proceeds to the step S614. On the other hand, if the inquiry about the sheet list information has not been received (NO to the step S612), the CPU 201 directly proceeds to the step S614.

In the step S614, the CPU 201 determines whether or not the inquiry about the adjustment value information, transmitted from the print control apparatus 102 in the step S508 in FIG. 5, has been received. If the inquiry about the adjustment value information has been received (YES to the step S614), the CPU 201 proceeds to the step S615, transmits the adjustment value information generated in the step S605 to the print control apparatus 102 as a response, and proceeds to the step S616. On the other hand, if the inquiry about the adjustment value information has not been received (NO to the step S614), the CPU 201 directly proceeds to the step S616.

In the step S616, the CPU 201 determines whether or not the request transmitted from the print control apparatus 102 in the step S511 in FIG. 5, for registering information on the transmission destination to which a change notification event is to be transmitted when the state of the image forming apparatus 103 is changed, has been received. If the request for registering the event transmission destination has been received (YES to the step S616), the CPU 201 proceeds to the step S617, whereas if the request for registering the event transmission destination has not been received (NO to the step S616), the CPU 201 proceeds to a step S618.

In the step S617, the CPU 201 performs registration of the event transmission destination, for adding the print control apparatus 102 to the event transmission destination, then transmits information notifying that the registration is successful to the print control apparatus 102, and proceeds to the step S618.

In the step S618, if the answers to the questions of the steps S606, S608, S610, S612, S614, and S616 are all affirmative (YES), the CPU 201 determines that the initialization process has been completed, and terminates the present process. On the other hand, if not all of the answers to the questions of the steps S606, S608, S610, S612, S614, and S616 are affirmative (YES), the CPU 201 determines that the initialization process has not been completed yet, and returns to the step S606.

Note that the sheet feed sections 116 are an example of the sheet feeders, but may be sheet feeders having another mechanism, such as an inserter or a manual feed tray, and its form is not limited.

Referring again to FIG. 4, when a user selects the sheet feeder button 410 of the sheet feed section 116-2 by operating e.g. the pointing device 115, a sheet feeder screen of the sheet feed section 116-2 is displayed. On this sheet feeder screen, the user is enabled to change the setting of sheets set in the sheet feed section 116-2 and values of settings of the sheets, which have been set. In a case where the user selects any of the sheet feeder buttons 41 to 417, the same operations as in the case where the user selects this sheet feeder button 410 are performed, and hence description thereof is omitted. Further, although in the following description, the use of the pointing device 115 and the like is omitted from the description of the user operation on the sheet management application, it goes without saying that the user uses such an input device for operation on the sheet management application.

Next, a description will be given of a screen operation on the image forming apparatus 103 in a case where, when the use of at least one of functions associated with the sheet setting of the image forming apparatus 103 requires authentication as a system administrator, the system administrator desires to use the at least one function requiring the authentication. Note that in such a case, the CPU 201 sets the image forming apparatus 103 to a state under authentication control. Here, the state of the image forming apparatus 103 under authentication control refers to a state in which the function of executing authentication processing (authentication function) is available in the image forming apparatus 103.

Figure 8A:
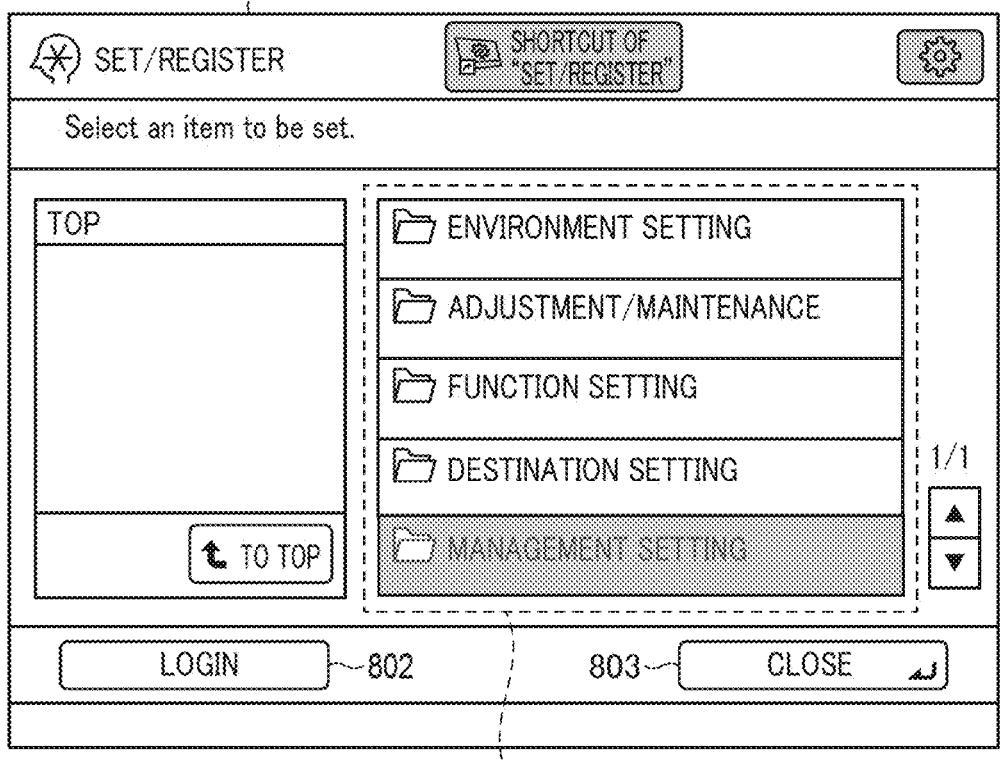
FIGS. 8A and 8B are diagrams showing an example of a setting screen and an authentication screen, respectively, which are displayed on a console panel of the image forming apparatus in a case where the image forming apparatus is under authentication management.
Figure 8B:
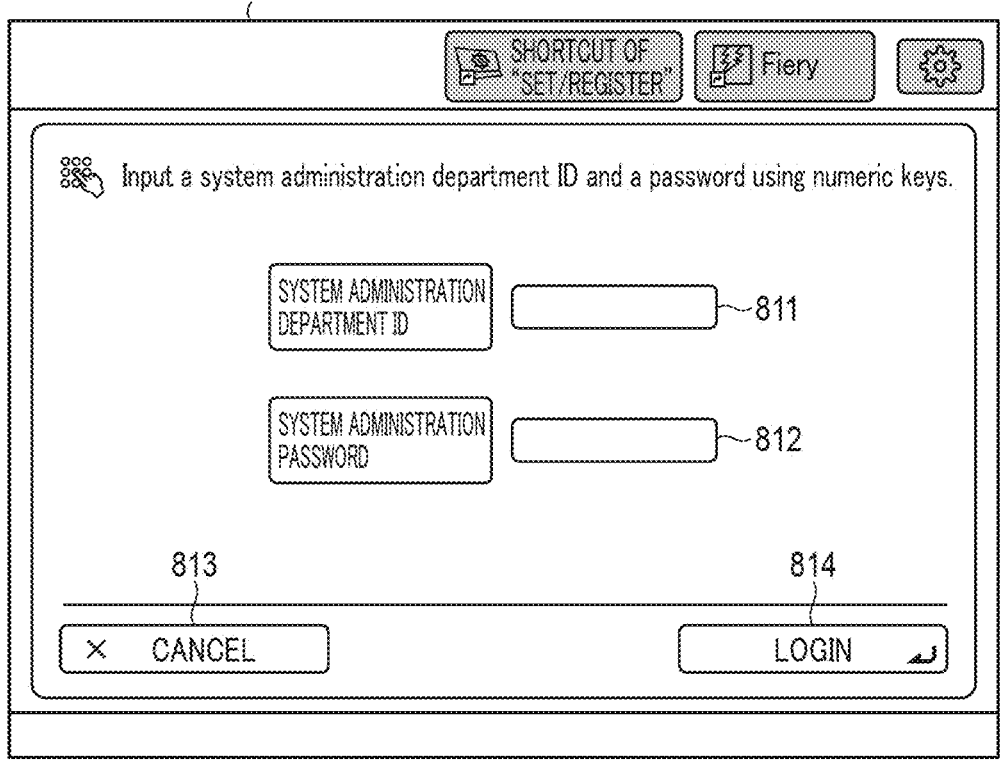

FIG. 8A is a diagram showing an example of a setting screen 800 displayed on the console panel 105 of the image forming apparatus 103 in a case where the image forming apparatus 103 is under authentication control. Further, FIG. 8B is a diagram showing an example of an authentication screen 810 displayed on the console panel 105 in the above-mentioned case.

The setting screen 800 displays a list of the functions available for a user in the image forming apparatus 103 as items 801. Further, the setting screen 800 has a login button 802 and a close button 803. However, since the image forming apparatus 103 is under authentication control, one (s) of the items 801, which require(s) authentication as a system administrator, is/are grayed out, and cannot be used without pressing the login button 802 to be authenticated as a system administrator. Examples of items requiring authentication as a system administrator include editing of the sheet information of the above-mentioned sheet settings management table 701 shown in FIG. 7. Editing of the sheet information has direct influence on the quality of a print product, and hence only a specific user, such as the system administrator of the image forming apparatus 103, is permitted to use this function. Such an item permitting only a specific user to use is hereafter referred to as an item restricted in use.

In a case where a user desires to edit the sheet information, the user presses the login button 802. With this, the CPU 201 displays the authentication screen 810, shown in FIG. 8B, and hence the user performs authentication so to be authenticated as a system administrator on this authentication screen 810.

The authentication screen 810 has an input field 811 for inputting a system administration department ID, an input field 812 for inputting a system administration password, a cancel button 813, and a login button 814.

When the login button 814 is pressed after a system administration department ID is input in the input field 811 and a password for the corresponding ID is input in the input field 812, the CPU 201 acquires the system administration department ID and password input in the input fields 811 and 812, as the administrator information. After that, the CPU 201 performs authentication of the acquired administrator information. More specifically, the CPU 201 checks whether or not the acquired administrator information matches authentication information (the system administrator ID and the administration number) stored in the external storage device 211 of the image forming apparatus 103. Note that the authentication information may be stored in the image forming apparatus 103 or stored in a storage device external to the image forming apparatus 103, such as a storage device of an authentication server. Here, if the items of the authentication information match, the CPU 201 determines that the authentication is successful, closes the authentication screen 810, and updates the setting screen 800 to a state in which all grayed-out items, which are restricted in use, are released from the grayed-out state. With this, the user having the administrator authority (system administrator) is permitted to operate all items displayed on the list of the items 801, including the items restricted in use. On the other hand, if the authentication information items do not match, the CPU 201 displays an error display notifying that the authentication has failed. That is, in this case, the user is not permitted to operate the items restricted in use. Note that a condition requiring authentication again after the authentication is once successful includes, for example, the lapse of a certain time period after the user touched the console panel 105 last time, and the restart of the image forming apparatus 10, but any other appropriate conditions may be used.

In the above description, since the image forming apparatus 103 is under authentication control, when the login button 802 is pressed, the authentication screen 810 is always displayed. However, the state of the image forming apparatus 103 may be set to a state in which the user is permitted to operate all of the functions of the image forming apparatus 103 displayed in the list as the items 801, without authentication on the authentication screen 810. In this case, users other than the system administrator are also permitted to use all of the functions associated with the sheet setting of the image forming apparatus 103. In this state, the CPU 201 sets the state of the image forming apparatus 103 to a state not under authentication control. Here, the state of the image forming apparatus 103 not under authentication control refers to a state in which the function of executing authentication processing (authentication function) cannot be used in the image forming apparatus 103.

The user can display an authentication control-setting screen on the console panel 105 of the image forming apparatus 103 and set, on this screen, whether or not to require authentication as a system administrator for using each of the functions of the image forming apparatus 103. That is, although in the present embodiment, authentication as a system administrator is required for using at least one of the functions associated with the sheet setting of the image forming apparatus 103, the function requiring this authentication is not limited to the function associated with the sheet setting.

In a case where the setting of authentication is configured on this authentication control-setting screen such that authentication as a system administrator is required for using at least one of the functions of the image forming apparatus 103, CPU 201 sets the state of the image forming apparatus 103 to the state under authentication control. On the other hand, in a case where the setting of authentication is configured on this authentication control-setting screen such that authentication as a system administrator is not required for using all of the functions of the image forming apparatus 103, CPU 201 sets the state of the image forming apparatus 103 to the state not under authentication control.

Note that in a case where the image forming apparatus 103 is not under authentication control, the CPU 201 grays out the login button 802 to prevent a user from erroneously pressing the login button 802 to display the authentication screen 810.

Note that although in the first embodiment, authentication is performed by causing the user to input the ID and the password of the system administrator on the authentication screen 810 as the administrator information, the authentication method is not limited to this, but any other form of the method can be employed insofar as it is possible to authenticate that the user as the operator is a system administrator. For example, biometric authentication, such as authentication using e.g. a fingerprint, an iris, or a face of a user, may be employed.

Next, a description will be given of changes, as characteristic features of the first embodiment, of the setting screen 900, shown in FIG. 9A, displayed when the configuration button 402 on the top screen 400 of the sheet management application, shown in FIG. 4, is pressed, in a case where the image forming apparatus 103 is under authentication control. That is, the configuration button 402 is a button for instructing the sheet management application to display the setting screen 900 for changing the system settings of the sheet management application.

When the configuration button 402 is pressed, the CPU 301 displays the setting screen 900 to display the current system settings according to the system settings stored in the external storage device 309.

The setting screen 900 has a plurality of tab screens which can be switched by using tabs. FIG. 9A shows an example of the setting screen 900, which includes a basic system setting tab 910a, an administrator setting tab 910b, and an information tab 910c. On the tab screen of the basic system setting tab 910a, it is possible to set, for example, language setting of words to be displayed on the screen of the sheet management application and setting of a unit system (millimeter or inch) of sheet sizes for display. The tab screen of the administrator setting tab 910b is a screen which can be displayed only by a user having the administrator authority and on which a setting associated with authentication, described hereinafter with reference to FIG. 9C, can be set. The tab screen of the information tab 910c displays information associated with the sheet management application, such as version information of the sheet management application.

Figure 9A:
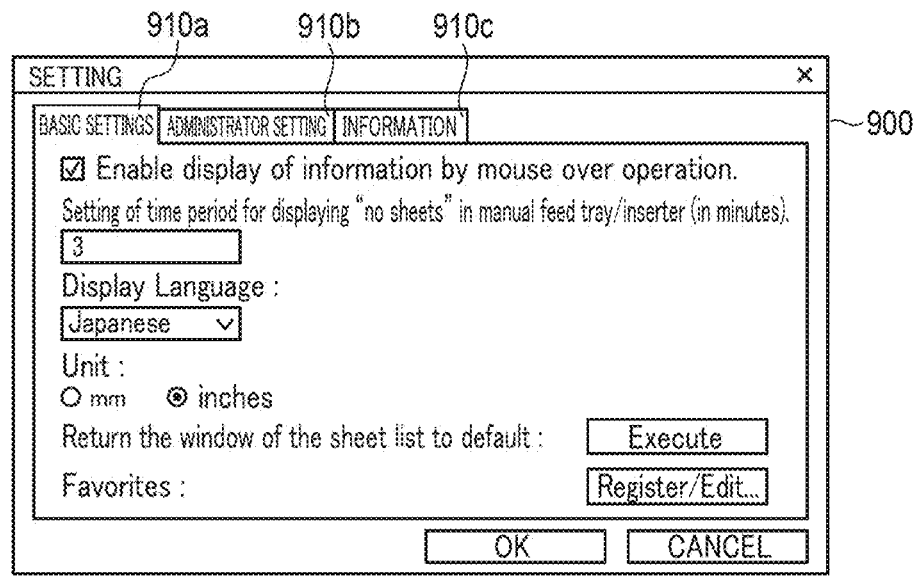
FIGS. 9A to 9C are diagrams showing changes of the screen when an administrator setting tab is pressed on a setting screen displayed by pressing a set button on the top screen of the sheet management application, in a case where the image forming apparatus is under authentication control.
Figure 9B:
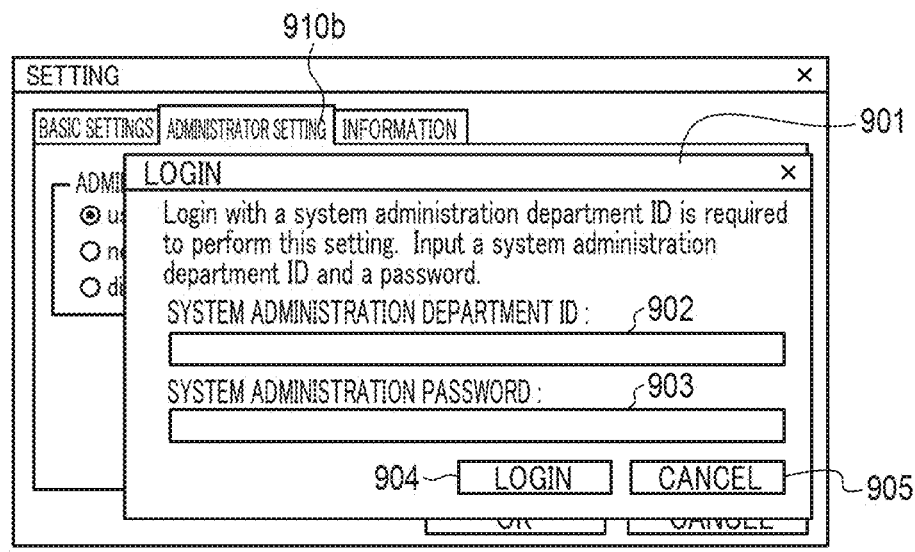

When the administrator setting tab 910b is pressed, an authentication screen 901, shown in FIG. 9B, is displayed to prompt a user to perform authentication. Although details of a screen display operation process, performed after the administrator setting tab 910b is pressed (clicked), will be described hereinafter with reference to FIG. 12, its outline will be described below with reference to FIGS. 9B and 9C.

Note that the administrator setting tab 910b is only required to be a UI part on the setting screen 900 shown in FIG. 9A, for receiving a user instruction for displaying a screen, shown in FIG. 9C, as a tab screen, described hereinafter. For example, the administrator setting tab 910b may be an icon included in the tab screen of the basic system setting tab 910a.

The authentication screen 901 shown in FIG. 9B has the same component elements as those of the authentication screen 810 (see FIG. 8B) displayed on the console panel 105 of the image forming apparatus 103. That is, the authentication screen 901 has an input field 902 for inputting a system administration department ID, an input field 903 for inputting a system administration password, a login button 904, and a cancel button 905.

When the login button 904 is pressed after a system administration department ID and a password for the corresponding ID are input in the input fields 902 and 903, respectively, the sheet management application (CPU 301) acquires the input system administrator ID and password as the administrator information. After that, the CPU 301 transmits the acquired administrator information to the image forming apparatus 103. Upon receipt of the administrator information transferred from the sheet management application, the CPU 201 of the image forming apparatus 103 performs authentication (operation of an authentication unit). More specifically, the CPU 201 checks whether or not the received administrator information matches authentication information stored in the external storage device 211. If the items of the authentication information match, the CPU 201 determines that the authentication is successful and notifies the sheet management application of the determination result that the authentication is successful. Upon receipt of this determination result notification, the sheet management application closes the authentication screen 901 and displays the tab screen of the administrator setting tab 910b, which is restricted in use, to permit the user to perform operation on items on the tab screen. On the other hand, if the authentication information items do not match, the CPU 201 determines that the authentication has failed and notifies the sheet management application of the determination result that the authentication has failed. Upon receipt of this determination result notification, the sheet management application displays e.g. an error display for prompting the user to re-input the system administrator ID and the password. That is, in this case, the sheet management application continues to display the authentication screen 901 until the authentication is successful when the user reinputs the ID and the password in the input fields 902 and 903 and presses the login button 904, or until the user presses the cancel button 905.

Next, the tab screen of the administrator setting tab 910b (authentication setting selection screen) displayed when the authentication is successful will be described.

Figure 9C:
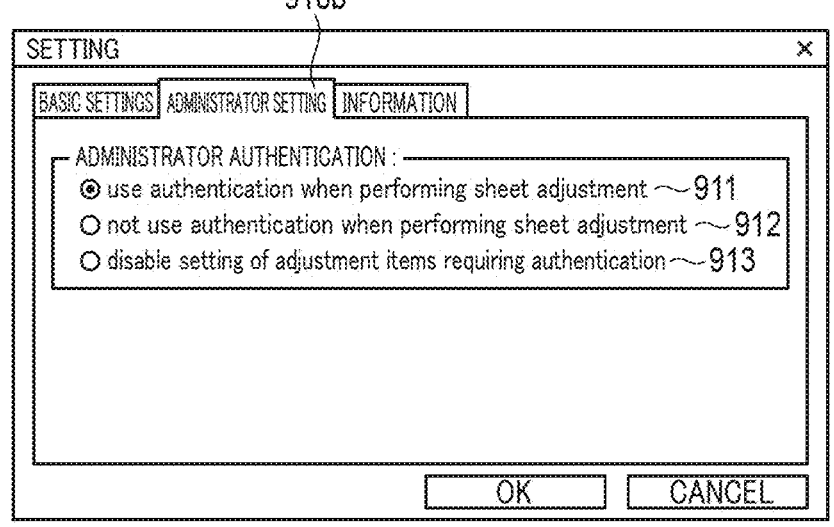

As shown in FIG. 9C, first to third options 911 to 913 to be selectively set by the user for authentication setting are displayed in an administrator authentication field on the tab screen of the administrator setting tab 910b.

The first option 911 is an option described as "use authentication when performing sheet adjustment" in FIG. 9C, for setting a first authentication setting for requiring authentication as a system administrator when an operation is performed on a function, restricted in use, of the image forming apparatus 103.

The second option 912 is an option described as "not use authentication when performing sheet adjustment" in FIG. 9C, for setting a second authentication setting for permitting use of the function, restricted in use, of the image forming apparatus 103, without authentication.

The third option 913 is an option described as "disable setting of adjustment items requiring authentication", in FIG. 9C, for setting a third authentication setting for indiscriminately disabling setting of functions, restricted in use, of the image forming apparatus 103.

A set value corresponding to the selected one of the first to third options 911 to 913, shown in FIG. 9C, in the administrator authentication field on the tab screen of the administrator setting tab 910b (hereinafter referred to as the set value of the administrator authentication) is stored in the external storage device 309, similarly to the other system settings. Details of the process performed after setting by selection from the first to third options 911 to 913 will be described hereinafter with reference to FIGS. 13A to 18.

Note that although in the present embodiment, the description is given of the method having the three options of the first to third options 911 to 913, the present invention is not limited to this, but it is only required that at least two of these options are included. For example, in the administrator authentication field on the tab screen of the administrator setting tab 910b, shown in FIG. 9C, only the first option 911 "use authentication when performing sheet adjustment" and the third option 913 "disable setting of adjustment items requiring authentication" may be displayed such that a user can select one of the two.

Further, the sheet management application may be configured to be capable of switching the connection destination from the image forming apparatus 103 to another image forming apparatus. Here, when the connection destination is changed to another image forming apparatus, the set value of the administrator authentication stored in the external storage device 309 may be returned to the initial value or may be still stored in the external storage device 309 after changing the connection destination. The set value of the administrator authentication may be managed on a connection destination basis. That is, the configuration may be such that the identification information of the image forming apparatus 103 and the set value of the administrator authentication are associated with each other and stored in the external storage device 309, and then when the sheet management application is connected to the image forming apparatus 103, the identification information of the image forming apparatus 103 is acquired and the set value of the administrator authentication associated with the acquired identification information is read out from the external storage device 309 and made valid.

Figure 10:
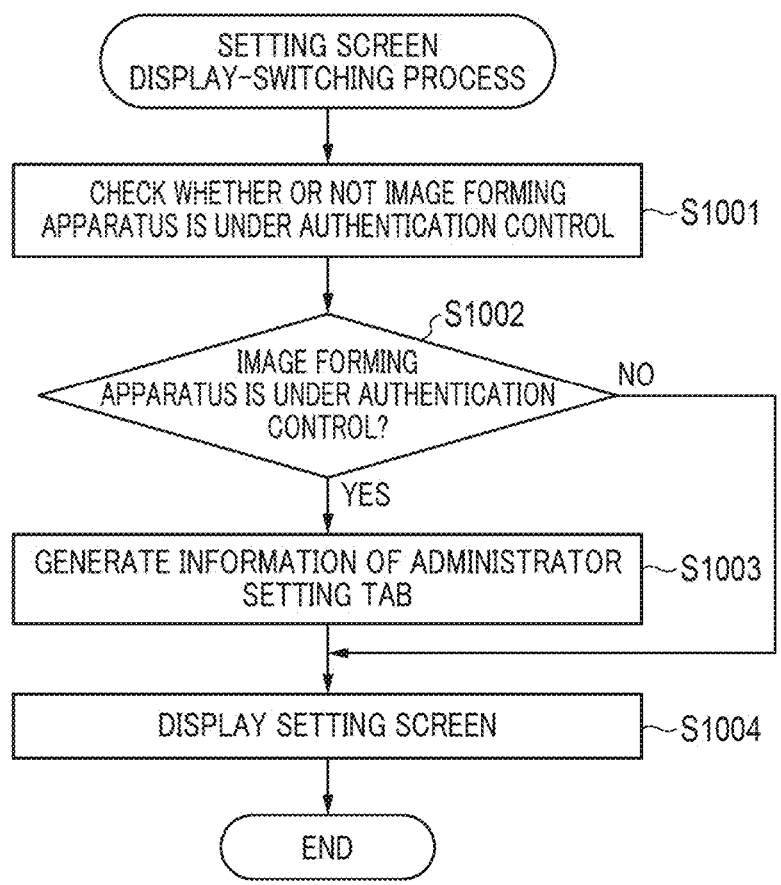
FIG. 10 is a flowchart of a setting screen display-switching process.

FIG. 10 is a flowchart of a setting screen display-switching process.

This process is started when the configuration button 402 on the top screen 400 of the sheet management application is pressed. Note that the present process is realized by the CPU 301 executing a program loaded into the RAM 302.

First, in a step S1001, the CPU 301 sends an inquiry about whether or not the image forming apparatus 103 is under authentication control to the image forming apparatus 103. That is, with this inquiry, the sheet management application (CPU 301) checks whether or not availability of each function of the image forming apparatus 103, associated with sheet setting of the image forming apparatus 103, can be controlled by authentication, using the authentication function of the image forming apparatus 103. Note that whether or not the image forming apparatus 103 is under authentication control may be inquired when the sheet management application is started.

If it is determined as a result of the inquiry in the step S1001 that the image forming apparatus 103 is under authentication control (YES to a step S1002), the CPU 301 proceeds to a step S1003. On the other hand, if not (NO to the step S1002), the CPU 301 displays the setting screen 1100, shown in FIG. 11 (step S1004), followed by terminating the present process.

Differently from the setting screen 900, shown in FIGS. 9A to 9C, the setting screen 1100 does not have the administrator setting tab 910b. This is because in a case where the image forming apparatus 103 is not under authentication control, the authentication function of the image forming apparatus 103 cannot be used from the sheet management application, either. More specifically, assuming that a user intends to use a function associated with sheet setting after selecting the above-mentioned first option 911 "use authentication when performing sheet adjustment" from the sheet management application, the sheet management application cannot execute authentication processing. In this case, in spite of setting the authentication setting "use authentication when performing sheet adjustment" by the sheet management application, authentication processing is not executed so that this may confuse the user. To avoid such a situation, the CPU 301 controls the administrator setting tab 910b to be hidden.

In the step S1003, the CPU 301 generates information on the administrator setting tab 910b and its tab screen. In this case, in the step S1004, the CPU 301 displays the setting screen 900 having the administrator setting tab 910b based on the information generated in the step S1003, followed by terminating the present process.

As described above, in the present embodiment, the inquiry about whether or not the image forming apparatus 103 is under authentication control is made when the sheet management application is started or when the configuration button 402 is pressed. On the other hand, there is a case where after transmitting the above-mentioned inquiry, the state of the image forming apparatus 103 is changed from the state not under authentication control to the state under authentication control. In this case, the administrator setting tab 910b is not displayed by the sheet management application, and authentication on the sheet management application is not demanded until the sheet management application is restarted or the configuration button 402 is pressed. That is, it is the same state as the state in which the second option 912 "not use authentication when performing sheet adjustment" is selected on the setting screen 900 described with reference to FIG. 9C. The state in which the second option 912 is selected is a state in which although the authentication function is available in the image forming apparatus 103, the sheet management application does not use the authentication function of the image forming apparatus 103.

This is not limitative, but in a case where the image forming apparatus 103 is changed between the state under authentication control and the state not under authentication control, the image forming apparatus 103 may transmit a predetermined notification to the sheet management application. Then, when this notification is received, the sheet management application may prompt the user to execute authentication setting on the administrator tab 910b by the sheet management application.

Figure 12:
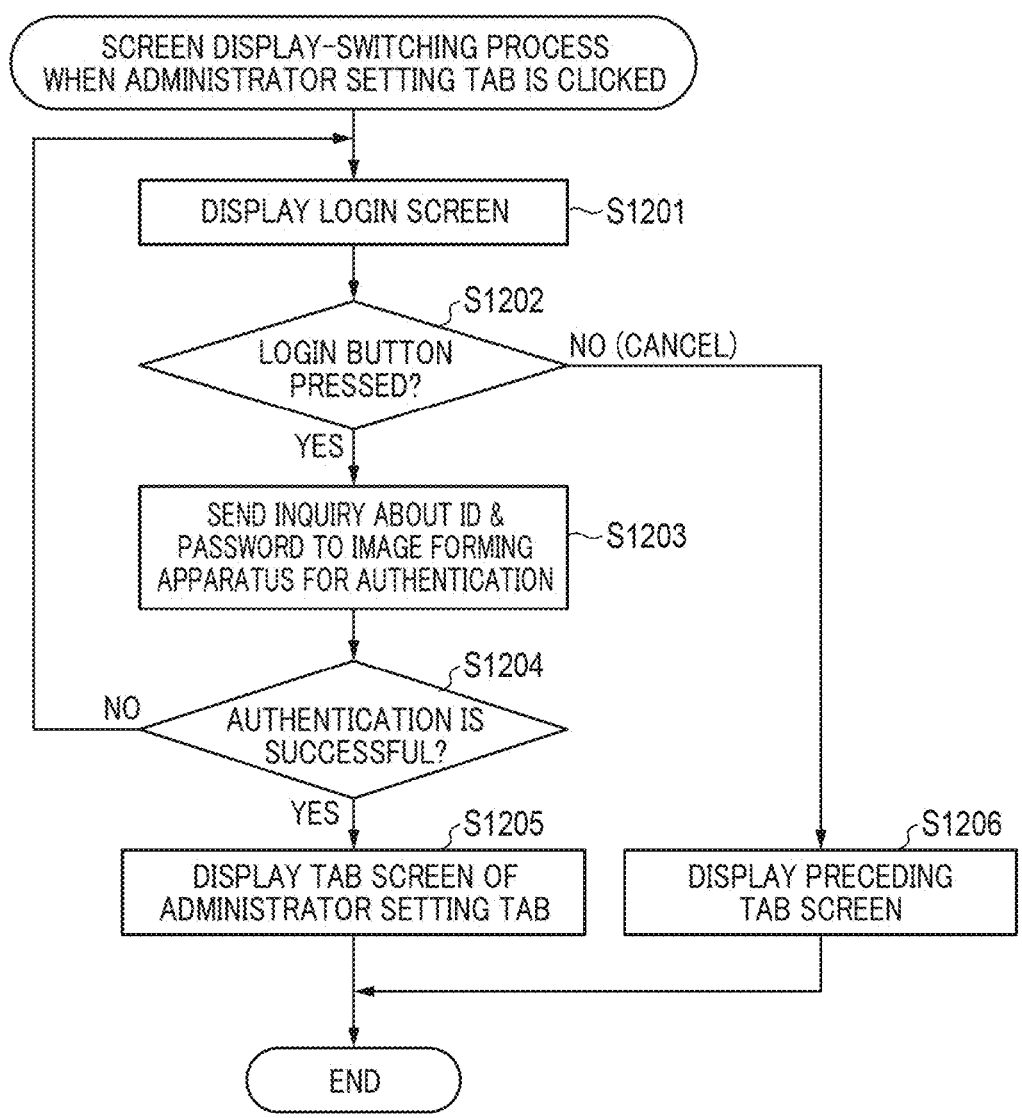
FIG. 12 is a flowchart of a screen display-switching process performed when the administrator setting tab appearing in FIG. 9A is clicked.

FIG. 12 is a flowchart of a screen display-switching process performed when the administrator setting tab 910b appearing in FIG. 9A is clicked.

First, in a step S1201, the sheet management application (CPU 301) displays the authentication screen (login screen) 901 shown in FIG. 9B.

In a step S1202, the sheet management application determines whether the login button 904 or the cancel button 905 is pressed.

If it is determined in the step S1202 that the login button 904 is pressed (YES to the step S1202), the sheet management application proceeds to a step S1203.

In the step S1203, the sheet management application sends an inquiry about the system administrator ID and password (administrator information) input in the input fields 902 and 903, respectively, to the image forming apparatus 103, and performs authentication. More specifically, first, the sheet management application transfers the administrator information to the image forming apparatus 103. The CPU 201 of the image forming apparatus 103 checks whether or not the transferred administrator information matches the authentication information stored in the external storage device 211. As a result of this check, the CPU 201 transmits, if the items of the authentication information match, a notification that the user authentication is successful, whereas if the authentication information items do not match, a notification that the user authentication has failed, to the sheet management application. Upon receipt of this notification, the sheet management application proceeds to a step S1204.

On the other hand, if it is determined in the step S1202 that the cancel button 905 is pressed (NO to the step S1202), the sheet management application proceeds to a step S1206.

In the step S1206, the sheet management application does not change the screen to the administrator setting tab 910b, but displays the screen of the tab (the tab screen of the basic system setting tab 910a, shown in FIG. 9A), displayed before the administrator setting tab 910b is pressed, followed by terminating the present process.

In the step S1204, if the notification that the user authentication is successful is received from the CPU 201 in the step S1203, the sheet management application proceeds to a step S1205. On the other hand, if the notification that the user authentication has failed is received from the CPU 201 in the step S1203, the sheet management application displays e.g. an error display for prompting the user to re-input the system administrator ID and the password, then returns to the step S1201, and displays the authentication screen 901.

In the step S1205, the sheet management application displays the tab screen of the administrator setting tab 910b, followed by terminating the present process.

Figure 11:
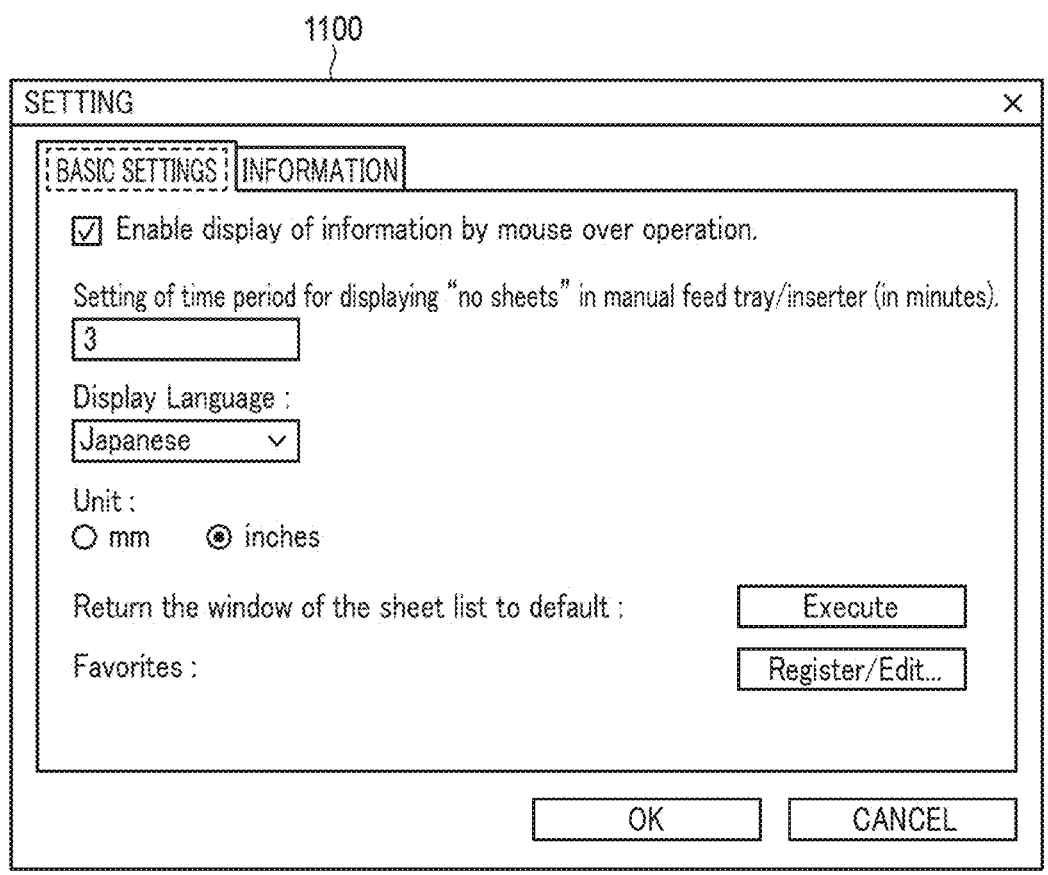
FIG. 11 is a diagram showing a setting screen displayed by pressing the set button on the top screen of the sheet management application, in a case where the image forming apparatus is not under authentication control.

Note that although in the present embodiment, in a case where the image forming apparatus 103 is not under authentication control when the configuration button 402 of the top screen 400 is pressed, the setting screen 1100, shown in FIG. 11, is displayed, the setting screen 900, shown in FIGS. 9A to 9C, may be displayed regardless of whether or not the image forming apparatus 103 is under authentication control. However, in this case, even when the image forming apparatus 103 is not under authentication control, the image forming apparatus 103 performs authentication of the administrator information, transferred from the sheet management application in the step S1203 in FIG. 12.

Note that a case is assumed, where the image forming apparatus 103 is changed by the CPU 201 from the state under authentication control to the state not under authentication control after the administrator tab 910b has been generated by the process in FIG. 10. In this case, even when the authentication setting "use authentication when performing sheet adjustment" is set by selecting the first option 911 on the tab screen of the administrator setting tab 910b, shown in FIG. 9C, authentication in sheet information adjustment is not performed by the image forming apparatus 103, and hence the user may be confused. Therefore, in such a case, the sheet management application may be controlled to be restarted when the user clicks the administrator setting tab 910b. Further, in such a case, when the user clicks the administrator setting tab 910b, a notification prompting the user to restart the sheet management application, such as display of a restart dialog, may be displayed before the restart.

Next, a description will be given of the operation of the sheet management application, as characteristic features of the first embodiment, performed in a case where the user has selected one of the first to third options 911 to 913 in the administrator authentication field on the tab screen of the administrator setting tab 910b, shown in FIG. 9C.

First, a description will be given of the operation of the sheet management application, performed in a case where the first option 911 has been selected, i.e. in a case where the first authentication setting has been set for requiring authentication as a system administrator when an operation is performed on a function, restricted in use, of the image forming apparatus 103.

Figure 13B:
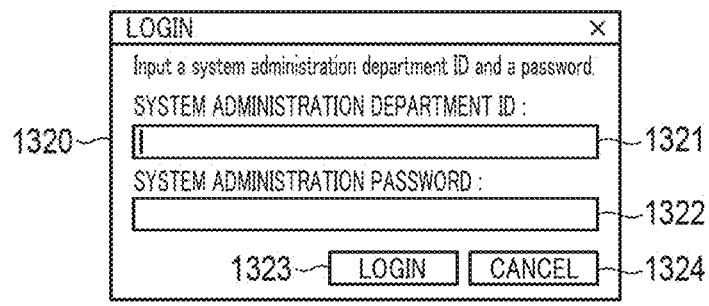

FIGS. 13A to 13C are diagrams useful in explaining changes of the screen when an edit button 1307 is pressed on the sheet list screen 1300 displayed by pressing the sheet list button 401 on the top screen 400 of the sheet management application in the case where the first authentication setting has been set.

FIG. 13A shows the sheet list screen 1300. More specifically, this screen is drawn by the CRTC 312 in the video memory according to an instruction from the CPU 301 and is displayed by outputting the image data drawn in the video memory to the display device 113 as the video signals.

The sheet list screen 1300 includes the sheet list display area 1301, a pull-down menu 1302, a search input area 1303, buttons 1304 to 1306 for adding a sheet to the sheet list, the edit button 1307, a delete button 1308, and a close button 1309.

The button 1304 is a button for registering a new sheet to the sheet list, and the button 1305 is a button for duplicating an existing sheet to the sheet list. Further, the button 1306 is a button for creating a sheet from a sheet database.

The close button 1309 is a button for terminating the display of the sheet list screen 1300.

The sheet list display area 1301 is an area displaying the sheet list and has a slider bar 1311. Here, the types of sheets are displayed in the column direction and items of sheet information, such as attributes of a sheet, are displayed in the row direction. A sheet being selected is highlighted in reverse video so as to make a user aware that the sheet is being selected. In a case where the user desires to display other sheets than the sheets currently displayed in the sheet list display area 1301, the other sheets can be displayed by operating the slider bar 1311.

The pull-down menu 1302 is for selecting one of the display methods of the sheet list display area 1301. In the first embodiment, the pull-down menu 1302 is formed such that one of the display methods, such as "display all", "regular customer A company", "regular customer B company", "regular customer C company", and "history", can be selected by a user. At the time of start of the display of the sheet list screen 1300, as shown in FIG. 13A, the display method of "display all" has been selected on the pull-down menu 1302. Here, the display methods of "regular customer A company", "regular customer B company", and "regular customer C company" are options for filtering the contents displayed in the sheet list display area 1301 for each item of information on favorites managed by the sheet settings management table 701, shown in FIG. 7, for each sheet ID for identifying a sheet.

The search input area 1303 is an area where a user inputs a keyword for searching for a desired one from the sheets displayed on the sheet list display area 1301. Incremental search can be executed in the search input area 1303, whereby search is automatically performed whenever a character is input.

The buttons 1304 to 1306, the edit button 1307, and the delete button 1308 are each a button for being pressed when using the function of editing sheet information, restricted in use, of the image forming apparatus 103. When one of these buttons is pressed, the sheet management application displays an authentication screen 1320 shown in FIG. 13B and prompts the user to perform authentication. Although details of a screen display-switching process, performed after pressing (clicking) the edit button 1307 will be described hereinafter with reference to FIG. 17, its outline is described below with reference to FIGS. 13A to 13C.

The authentication screen 1320 shown in FIG. 13B has the same component elements as those of the authentication screen 810 (see FIG. 8B), displayed on the console panel 105 of the image forming apparatus 103. That is, the authentication screen 1320 has an input field 1321 for inputting a system administration department ID, an input field 1322 for inputting a system administration password, a login button 1323, and a cancel button 1324.

When the login button 1323 is pressed after a system administration department ID and a password for the corresponding ID are input in the input fields 1321 and 1322, respectively, the sheet management application (CPU 301) acquires the input system administrator ID and password as the administrator information. After that, the CPU 301 transmits the acquired administrator information to the image forming apparatus 103. Upon receipt of the administrator information transferred from the sheet management application, the CPU 201 of the image forming apparatus 103 performs authentication (operation of the authentication unit). More specifically, the CPU 201 checks whether or not the received administrator information matches authentication information stored in the external storage device 211. If the items of the authentication information match, the CPU 201 determines that the authentication is successful and notifies the sheet management application of the determination result that the authentication is successful. Upon receipt of this determination result notification, the sheet management application closes the authentication screen 1320 and displays a sheet information-editing screen 1340, shown in FIG. 13C, which is restricted in use, to permit the user to perform operation on various items on the sheet information-editing screen 1340. On the other hand, if the authentication information items do not match, the CPU 201 determines that the authentication has failed and notifies the sheet management application of the determination result that the authentication has failed. Upon receipt of this determination result notification, the sheet management application displays e.g. an error display for prompting the user to re-input the system administrator ID and the password. That is, in this case, the sheet management application continues to display the authentication screen 1320 until the authentication is successful when the user re-inputs the ID and the password in the input fields 1321 and 1322 and presses the login button 1323 or until the user presses the cancel button 1324.

Note that a case is assumed where the state of the image forming apparatus 103 is changed by the CPU 201 from the state under authentication control to the state not under authentication control after the sheet list screen 1300 shown in FIG. 13A has been displayed. In this case, when the button 1304 is pressed in a state where the first authentication setting ("use authentication when performing sheet adjustment") has been set, the authentication based on the administrator information input on the displayed authentication screen 1320 is not performed by the image forming apparatus 103 and hence the user may be confused. Therefore, in such a case, the sheet management application may be controlled to be restarted when the user clicks the button 1304. Further, in such a case, when the user clicks the button 1304, a notification (restart dialog) may be displayed for confirming the user whether the sheet management application is allowed to be restarted, before the restart of the same.

Next, the sheet information-editing screen 1340 (see FIG. 13C) displayed when the authentication is successful will be described.

The sheet information-editing screen 1340 is a screen for registering a new sheet and editing sheet information which has already been registered.

The sheet information-editing screen 1340 includes a sheet information input area 1341, an adjustment item list 1342, a pull-down menu 1343, an OK button 1344, and a cancel button 1345.

The sheet information input area 1341 includes necessary minimum setting items of the sheet information for using a sheet. In the first embodiment, the setting items are displayed including, for example, name, basis weight, color, surface property, size, characteristic feature, sheet fiber direction setting, second side of double-sided print, and favorites.

Further, the sheet information input area 1341 includes areas 1346, 1347, and 1351, pull-down menus 1348 to 1350, 1352, and 1353, radio buttons 1354, a menu 1355, and a button 1356, for editing the contents of the setting items.

The area 1346 is a text area for inputting a name of the sheet. The user can change the name of the sheet by inputting characters using e.g. the keyboard 114. To reflect the changed name of the sheet to the sheet information, the user presses the OK button 1344 on the sheet information-editing screen 1340. By pressing the OK button 1344, it is possible to change the sheet information on both of the print control apparatus 102 and the image forming apparatus 103. On the other hand, the change of the name of the sheet can be canceled by pressing the cancel button 1345.

The area 1347 is a text area for inputting a basis weight. The operation performed with respect to this area is the same as that for the area 1346, and hence, hereafter, description of the same operation for arears including this area is omitted.

The pull-down menu 1348 is for displaying a list of sheet colors from which the user can select one.

The pull-down menu 1349 is a pull-down menu for displaying a list of surface property information items of sheets from which the user can select one.

The pull-down menu 1350 is for displaying a list of sizes of sheets from which the user can select one as a user-defined size.

The area 1351 is a text area where lengths of the sheet size in a main scanning direction and a sub scanning direction can be input in a case where the user-defined size is selected on the pull-down menu 1350. Note that on the sheet information-editing screen 1340, shown in FIG. 13C, the sheet size of 13×19 has been selected, and hence the area 1351 is grayed out (enclosed by broken lines in FIG. 13C) to disable the user from inputting values. Note that a button enabling the user to switch the units of input between millimeter and inch may be provided.

The pull-down menu 1352 is for displaying a list of characteristic feature information items from which the user can select one.

The pull-down menu 1353 is for displaying a list of fiber direction settings of sheets from which the user can select one fiber direction setting. The fiber direction setting of sheets refers to setting of whether to use sheets having a fiber direction orthogonal to the sheet feeding direction or sheets having a fiber direction parallel to the sheet feeding direction.

The radio buttons 1354 display double-sided print second side information, and enable the user to switch between "set" and "not set". The double-sided print second side information refers to setting for changing a transfer voltage to be applied in a case where a sheet having an image fixed on the front side is inserted in the sheet feeder and an image is fixed on the reverse side of the sheet.

The menu 1355 displays a list of favorites managed by a favorite setting table stored in the external storage device 309, from which the user can set a favorite to which the sheet information is caused to belong. Here, the list of favorites is displayed with check boxes, and if a check box is checked, this indicates that the sheet information belongs to the corresponding favorite. In the illustrated example shown in FIG. 13C, none of three favorites are checked on the menu 1355, and hence this indicates that the sheet information belongs to none of the favorites. In a case where the user checks one of the three check boxes, the user presses the OK button 1344 on the sheet information-editing screen 1340 to cause the sheet information to belong to the checked favorite. By pressing the OK button 1344, it is possible to change the sheet information on both of the print control apparatus 102 and the image forming apparatus 103. In a case where the sheet information-editing screen 1340 is displayed when the sheet information of sheets being selected on the list display area 1301 belongs to one of the favorites, the CPU 301 controls the setting management unit 357 to acquire the information of the favorite to which the corresponding sheet information belongs, from the favorite setting table. Then, the CPU 301 controls the UI control unit 352 to display the sheet information-editing screen 1340 according to the acquired information of the favorite.

The button 1356 is for displaying a favorite management screen. On the favorite management screen, the user can add, edit, and delete a favorite managed by the favorite setting table.

The adjustment item list 1342 displays a list of items which can be adjusted by settings included in the sheet information (hereinafter referred to as the adjustment items), each with a name, information of "adjusted"/"not adjusted", and a display group. The setting of each adjustment item is adjusted as follows: First, when a desired adjustment item is selected by the user from the adjustment item list 1342, the display is changed from the sheet information-editing screen 1340 to a screen including detailed values of the current adjustment values of the target adjustment item and adjustment buttons. Then, when one of the adjustment buttons on this screen is pressed, a screen on which the adjustment value of the target adjustment item can be changed is displayed. Whether or not the adjustment value has been changed on this screen is displayed by the information of "adjusted"/"not adjusted" in the adjustment item list 1342. Further, the display group defines a group to which each adjustment item belongs.

The outline will be described with respect to some of the adjustment items displayed on the adjustment item list 1342.

The adjustment item "gloss/black grade adjustment" is for adjusting the gloss of an output image by adjusting the temperature of a fixing device e.g. when plain paper or coated paper is used. This adjustment item belongs to a display group defined as "image quality".

The adjustment item "secondary transfer voltage adjustment" is for changing the voltage applied when transferring a toner image onto a sheet. This adjustment item belongs to the display group defined as "image quality".

The adjustment item "trailing end white void correction" is for changing the transfer voltage in a case where a void of toner is generated or a color becomes light at a trailing end of a sheet in the conveying direction. This adjustment item belongs to the display group defined as "image quality".

The adjustment item "secondary transfer static elimination bias adjustment" is for changing a voltage value (static elimination bias) for eliminating static electricity remaining on an intermediate transfer belt. This adjustment item belongs to the display group defined as "image quality".

The adjustment item "ITB image removal adjustment" is for changing a degree of removal of an image from the intermediate transfer belt. This adjustment item belongs to the display group defined as "image quality".

The adjustment item "toner amount adjustment mode" is for changing the total amount of toner. This adjustment item belongs to the display group defined as "image quality".

The adjustment item "primary transfer voltage adjustment" is for changing a voltage applied when transferring a toner image onto the intermediate transfer belt. This adjustment item belongs to the display group defined as "image quality".

The adjustment item "image position adjustment" is for changing a print position with respect to a front side and a reverse side of a sheet. This adjustment item belongs to the display group defined as "image quality".

The adjustment item "leading end/trailing end margin adjustment" is for changing lengths of margins on the leading end and the trailing end in the conveying direction for printing. This adjustment item belongs to the display group defined as "image quality".

Although there are a lot of setting items of the sheet information other than the above items, description thereof is omitted here.

The pull-down menu 1343 is for enabling a user to select one of filters for filtering the adjustment item list 1342 for display of each display group. For example, when the "image quality" is selected on the pull-down menu 1343, the CPU 301 controls the UI control unit 352 to display only the adjustment items in the adjustment item list 1342 which belong to the display group "image quality".

Next, a description will be given of the operation of the sheet management application performed when the second option 912 has been selected, i.e. when the second authentication setting has been set for permitting use of a function, restricted in use, of the image forming apparatus 103, without authentication.

In a case where the sheet list button 401 is pressed on the top screen 400 when the second authentication setting has been set, similar to the case where the first authentication setting has been set, the sheet management application displays the sheet list screen 1300 shown in FIG. 13A.

However, even when one of the buttons 1304 to 1306 on the sheet list screen 1300 is pressed, differently from the case where the first authentication setting has been set, the sheet information-editing screen corresponding to the pressed button is directly displayed without displaying the authentication screen 1320, shown in FIG. 13B. That is, for example, when the edit button 1307 on the sheet list screen 1300 is pressed, the sheet information-editing screen 1340, shown in FIG. 13C, is directly displayed without displaying the authentication screen 1320. Details of the screen display-switching process after pressing (clicking) the edit button 1307 will be described hereinafter with reference to FIG. 17. Thus, in the case where the second authentication setting ("not use authentication when performing sheet adjustment") has been set, the user is permitted to operate the sheet information-editing screen 1340 without authentication.

Next, a description will be given of the operation of the sheet management application performed when the third option 913 has been selected, i.e. when the third authentication setting has been set for indiscriminately disabling setting of a function, restricted in use, of the image forming apparatus 103.

Figure 14:
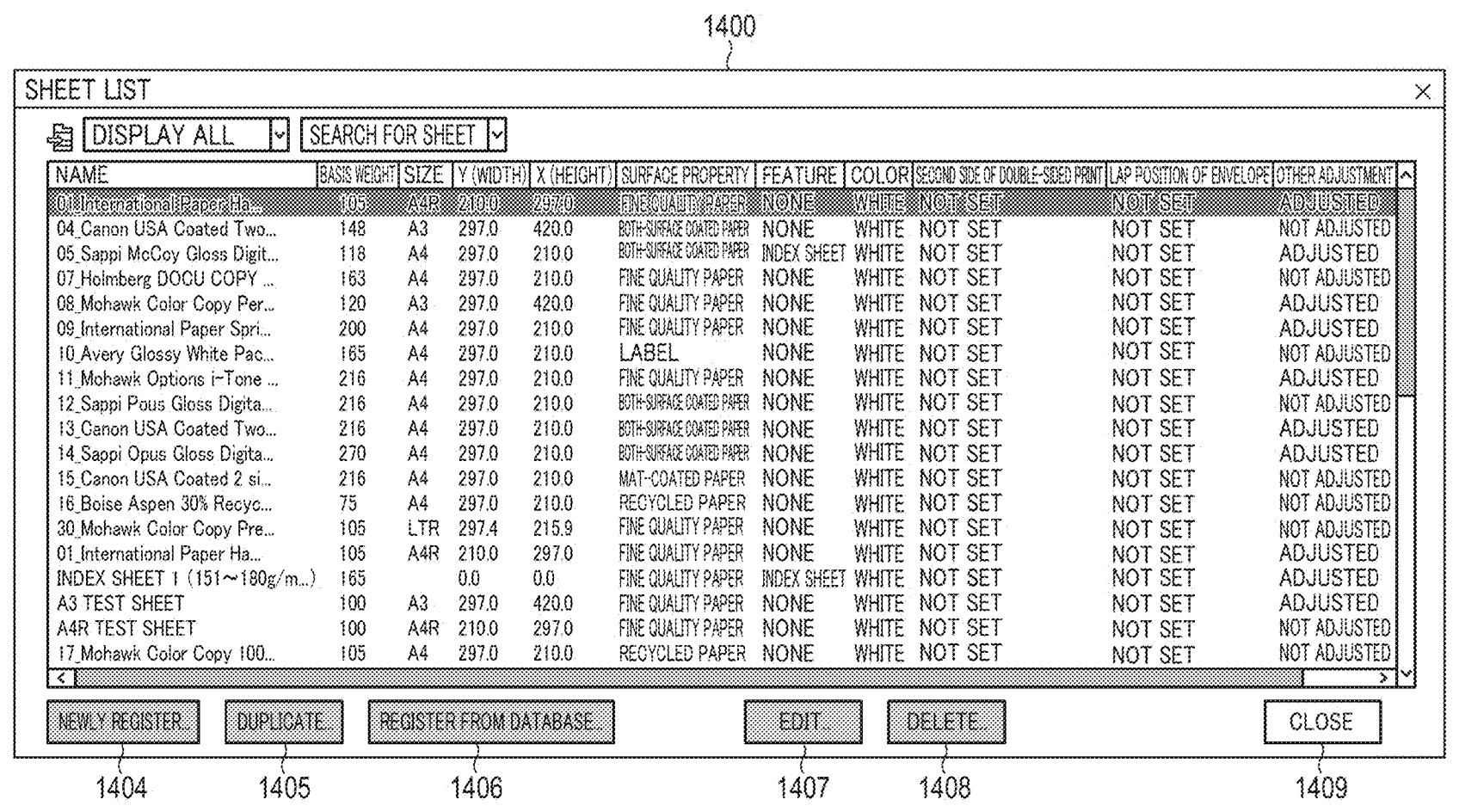

FIG. 14 is a diagram showing a sheet list screen 1400 displayed by pressing the sheet list button 401 on the top screen 400 of the sheet management application in the case where the third authentication setting has been set.

More specifically, the sheet list screen 1400 is displayed when the CRTC 312 draws image data in the video memory according to an instruction from the CPU 301 and outputs this image data drawn in the video memory, to the display device 113 as video signals.

The screen configuration of the sheet list screen 1400 is the same as that of the sheet list screen 1300, described with reference to FIG. 13A. The buttons 1304 to 1306, the edit button 1307, and the delete button 1308, included in the sheet list screen 1300, are each a button for being pressed when using the function of editing sheet information, restricted in use, of the image forming apparatus 103. Therefore, as described hereinabove, in the case where the first authentication setting ("use authentication when performing sheet adjustment") has been set, when one of these buttons is pressed, the authentication screen 1320, shown in FIG. 13B, is displayed to prompt the user to perform authentication. On the other hand, in a case where the third authentication setting ("disable setting of adjustment items requiring authentication") has been set, buttons 1404 to 1408 corresponding to all these buttons 1304 to 1308, respectively, are grayed out to disable the user from setting the adjustment items requiring authentication. That is, out of the buttons 1404 to 1409, the user is permitted to operate only a close button 1409 for use in closing the sheet list screen 1400. With this, it is possible to prevent a user not having the use authority of a function, restricted in use, of the image forming apparatus 103, from erroneously instructing an unauthorized operation. Further, it is possible to eliminate troublesomeness caused when the authentication screen 1320, shown in FIG. 13B, is displayed in a case where the user erroneously instructs an unauthorized operation.

Figure 15:
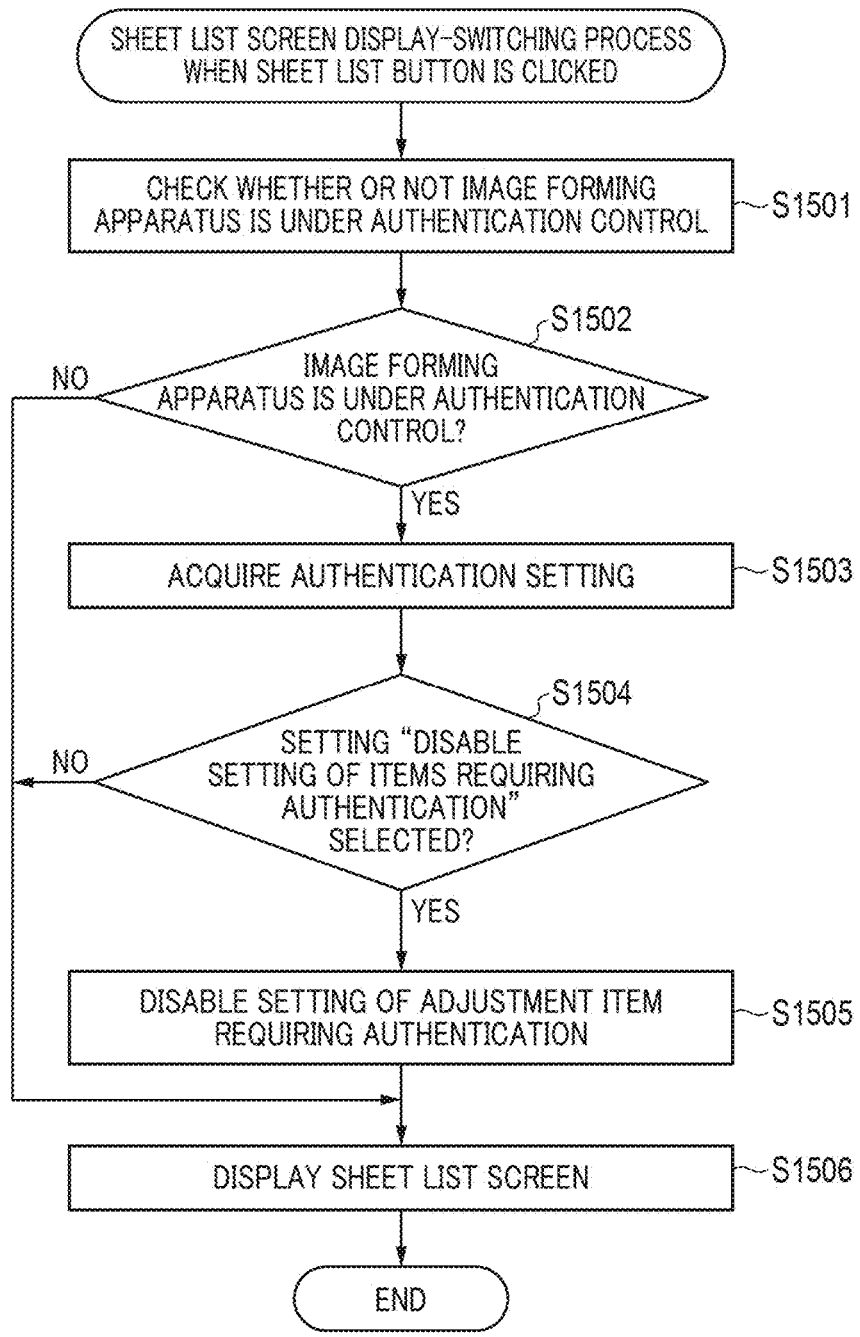
FIG. 15 is a flowchart of a sheet list screen display-switching process.

FIG. 15 is a flowchart of a sheet list screen display-switching process according to the first embodiment. The present process is started when the sheet list button 401 on the top screen 400 of the sheet management application is pressed (clicked). The present process is realized by the CPU 301 executing a program loaded into the RAM 302.

First, in a step S1501, the CPU 301 sends an inquiry about whether or not the image forming apparatus 103 is under authentication control to the image forming apparatus 103. As a result of this inquiry, if the image forming apparatus 103 is under authentication control (YES to a step S1502), the CPU 301 proceeds to a step S1503. On the other hand, if not (NO to the step S1502), the CPU 301 proceeds to a step S1506 and displays the sheet list screen 1300 shown in FIG. 13A, followed by terminating the present process. In this case, similar to the case where the second authentication setting ("not use authentication when performing sheet adjustment") has been set, the user is permitted to operate the sheet information-editing screen 1340, shown in FIG. 13C, only by pressing the edit button 1307 without authentication.

In the step S1503, the CPU 301 acquires the authentication setting currently set. That is, the CPU 301 determines which of the first to third options 911 to 913 has been selected on the administrator authentication field of the tab screen of the administrator setting tab 910b shown in FIG. 9C.

In a step S1504, if it is determined that the third authentication setting "disable setting of adjustment items requiring authentication" has been set, the CPU 301 proceeds to a step S1505. If an authentication setting other than the third authentication setting has been set, the CPU 301 proceeds to the step S1506, and displays the sheet list screen 1300, shown in FIG. 13A, followed by terminating the present process.

In the step S1505, the CPU 301 disables the adjustment items requiring authentication from being set. That is, the CPU 301 generates information that the buttons 1404 to 1408 are to be grayed-out, as shown in FIG. 14.

In the step S1506, the CPU 301 displays the sheet list screen 1400 based on the information generated in the step S1505, followed by terminating the present process.

FIG. 16 is a diagram showing an example of the login control object table 1600 used in the step S1505 and a step S1804, described hereinafter with reference to FIG. 18.

The login control object table 1600 is stored in the external storage device 309 and includes a button ID 1601, a button name 1602, and authentication control 1603.

The button ID 1601 is an ID of each of the buttons 1304 to 1309 arranged on the sheet list screen 1300 of the sheet management application.

The button name 1602 is a name displayed on each of the buttons 1304 to 1309 arranged on the sheet list screen 1300).

The authentication control 1603 specifies whether or not authentication is required to display the next screen in a case where one of the buttons 1304 to 1309 arranged on the sheet list screen 1300 is pressed. Here, if required, "YES" is set, whereas if not required, "NO" is set. Note that the setting of this authentication control 1603 may be configured such that an item requiring authentication is determined before factory shipment and a user is not permitted to change the item after the factory shipment.

For example, on the sheet list screen 1300 shown in FIG. 13A, the buttons 1304 to 1308 are buttons, restricted in use, of the image forming apparatus 103, and are each pressed when editing sheet information, and hence the authentication control is set to "YES". On the other hand, the close button 1309 is a button for closing the sheet list screen 1300, and is not pressed when editing sheet information, and hence the authentication control is set to "NO".

In the step S1505 in FIG. 15, the CPU 301 identifies buttons for which the authentication control is set to "YES" on the login control object table 1600, and sets all the identified buttons to buttons to be grayed out in the step S1506.

In a step S1803, described hereinafter with reference to FIG. 18, when one of the buttons 1304 to 1309 on the sheet list screen 1300 shown in FIG. 13A is pressed, whether or not the operation of pressing the button is an operation requiring authentication for displaying the next screen is determined based on this login control object table 1600.

This login control object table 1600 may be generated such that it is equivalent to the authentication control-setting screen displayed on the console panel 105 of the image forming apparatus 103. Further, the login control object table 160 may describe each function of the sheet management application independently of the functions of the image forming apparatus 103. For example, the sheet management application includes information on favorites, in the display method selected by a user on the pull-down menu 1302 appearing in FIG. 13A and in contents registered in the sheet settings management table 701 shown in FIG. 7. The sheet management function based on the information on the favorites is not equipped in the image forming apparatus 103 and is specific to the sheet management application. Therefore, a user operation associated with this function, e.g. the setting of the authentication control 1603 in a case where the button 1356 is pressed can be easily coped with by adding this to the login control object table 1600 independently of the functions of the image forming apparatus 103.

Although in the first embodiment, the authentication control 1603 in a case where each of the buttons 1304 to 1309 arranged on the sheet list screen 1300 of the sheet management application is pressed is set in the login control object table 1600, this is not limitative. For example, various functions for editing sheet information and operations for starting the various functions, such as a mouse over operation and a drag-and-drop operation, may be described in the login control object table 1600, and the authentication control may be set for each corresponding element.

Further, although in the first embodiment, the login control object table 1600 is stored in the external storage device 309, this is not limitative. For example, the login control object table 1600 may be stored in the external storage device 211 of the image forming apparatus 103.

Figure 17:
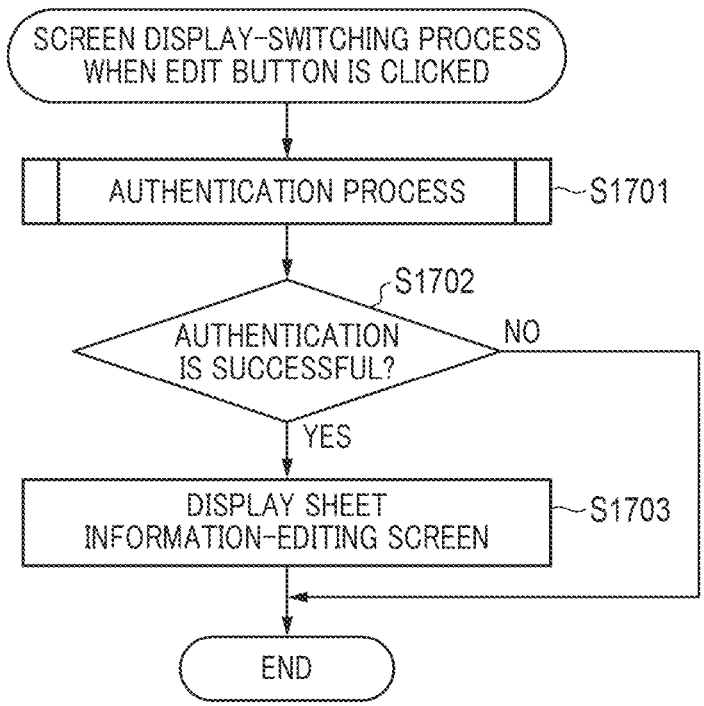
FIG. 17 is a flowchart of a screen display-switching process performed when the edit button is pressed on the sheet list screen.

FIG. 17 is a flowchart of the screen display-switching process performed when the edit button 1307 is pressed (clicked) on the sheet list screen 1300 (see FIG. 13A) of the sheet management application. Note that the present process is realized by the CPU 301 executing a program loaded into the RAM 302. Further, as described hereinabove, the edit button 1307 can be pressed when the first authentication setting ("use authentication when performing sheet adjustment") or the second authentication setting ("not use authentication when performing sheet adjustment") has been set.

First, in a step S1701, the CPU 301 executes an authentication process using the authentication management unit 358. Details of the authentication process will be described hereinafter with reference to FIG. 18.

In a step S1702, as a result of the authentication process in the step S1701, the CPU 301 determines whether or not the authentication is successful. If the authentication is successful (YES to the step S1702), the CPU 301 proceeds to a step S1703 and displays e.g. the sheet information-editing screen 1340 shown in FIG. 13C, followed by terminating the present process. On the other hand, if it is determined that the authentication has failed (NO to the step S1702), the CPU 301 terminates the present process without displaying the sheet information-editing screen 1340.

Figure 18:
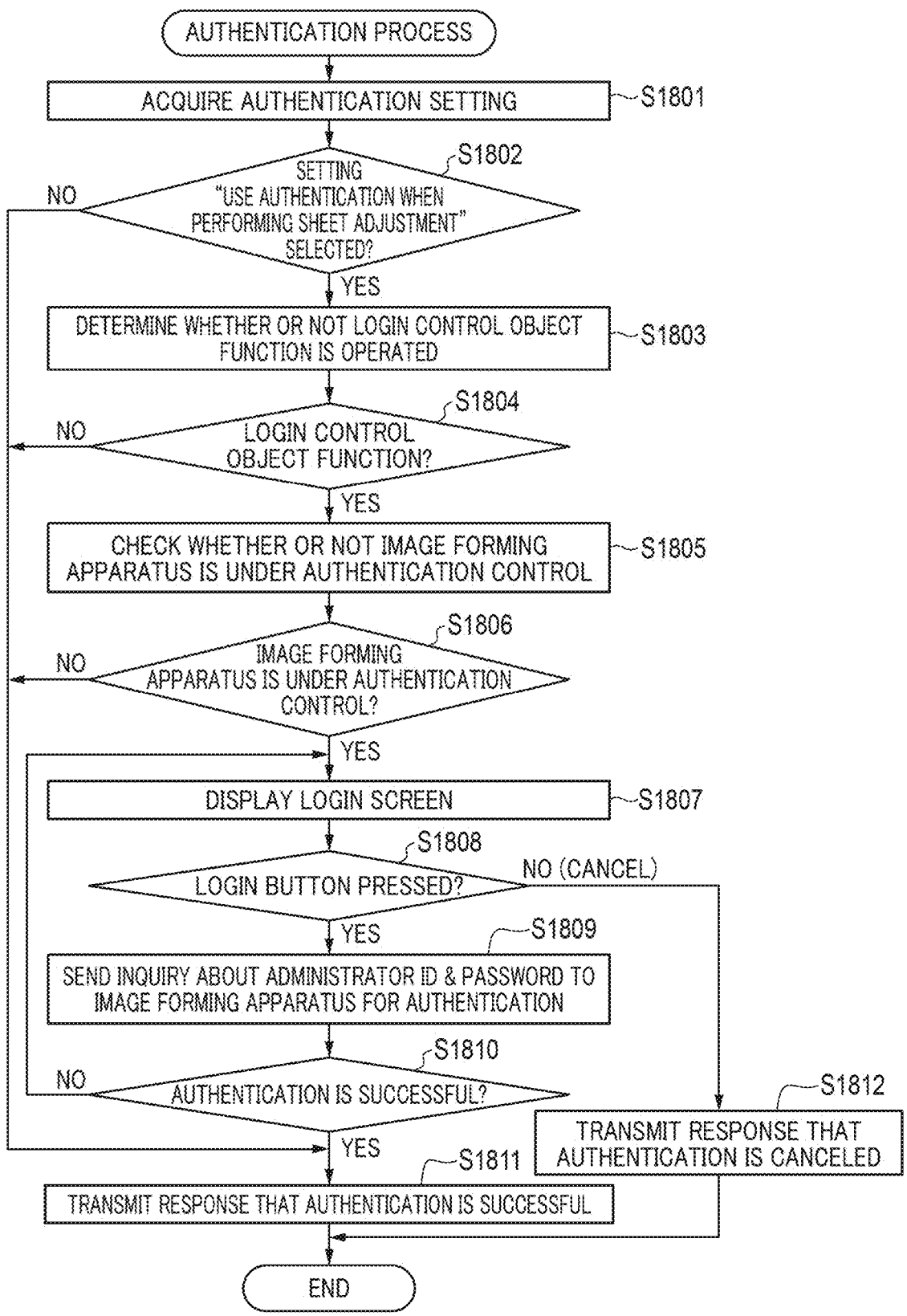
FIG. 18 is a flowchart of an authentication process performed in a step S1701 in FIG. 17.

FIG. 18 is a flowchart of the authentication process in the step S1701 in FIG. 17.

First, in a step S1801, the CPU 301 acquires the authentication setting currently set. That is, the CPU 301 determines which of the first to third options 911 to 913 has been selected on the administrator authentication field of the tab screen of the administrator setting tab 910*b* shown in FIG. 9C.

In a step S1802, if it is determined that the first authentication setting "use authentication when performing sheet adjustment" has been set, the CPU 301 proceeds to the step S1803. If it is determined that the second authentication setting ("not use authentication when performing sheet adjustment") has been set, the CPU 301 proceeds to a step S1811 and transmits a response that the authentication is successful, followed by terminating the present process.

Next, in the step S1803, the CPU 301 refers to the login control object table 1600 shown in FIG. 16 and determines whether or not the user intends to operate a login control object function. In this determination, more specifically, whether or not the operation of pressing the edit button 1307 at the start of the process in FIG. 17 is an operation requiring authentication for displaying the next screen is determined based on the login control object table 1600. As in the present embodiment, if the operation of pressing the edit button 1307 is an operation requiring authentication for displaying the next screen, it is determined that the user intends to operate a login control object function.

In the step S1804, if it is determined in the step S1803 that the user intends to operate a login control object function, the CPU 301 proceeds to a step S1805, and sends an inquiry about whether or not the image forming apparatus 103 is under authentication control to the image forming apparatus 103. On the other hand, if it is determined that the user does not intend to operate a login control object function, the CPU 301 proceeds to the step S1811 and transmits the response that the authentication is successful, followed by terminating the present process.

As a result of the inquiry in the step S1805, if the image forming apparatus 103 is under authentication control (YES to a step S1806), CPU 301 proceeds to a step S1807. On the other hand, if not (NO to the step S1806), the CPU 301 proceeds to the step S1811 and transmits the response that the authentication is successful, followed by terminating the present process.

In the step S1807, the CPU 301 displays the authentication screen 1320 shown in FIG. 13A to prompt the user to perform authentication, and proceeds to a step S1808.

If the operation of pressing the login button 1323 on the authentication screen 1320 is detected (YES to the step S1808), the CPU 301 proceeds to a step S1809.

In the step S1809, the CPU 301 send an inquiry about the system administrator ID and password (administrator information) input on the authentication screen 1320 to the image forming apparatus 103, for authentication. This processing is the same as the step S1203 and hence description thereof is omitted.

On the other hand, if the operation of pressing the cancel button 1324 on the authentication screen 1320 is detected (NO to the step S1808), the CPU 301 proceeds to a step S1812 and transmits a response that the authentication has been canceled, followed by terminating the present process.

In a step S1810, if the notification that the user authentication is successful is received from the image forming apparatus 103 (CPU 201) in the step S1809, the CPU 301 proceeds to the step S1811. On the other hand, if the notification that the user authentication has failed is received from the CPU 201 in the step S1809, the CPU 301 displays e.g. an error display for prompting the user to re-input the system administrator ID and the password, and returns to the step S1807. Thus, the CPU 301 continues to display the authentication screen 1320 to prompt the user to re-input the system administrator ID and the password until the authentication is successful or until the cancel button 1324 is pressed on the authentication screen 1320.

In the step S1811, the CPU 301 returns a response that the authentication is successful, followed by terminating the present process.

As described above, according to the first embodiment, in the print control apparatus 102 connected to the image forming apparatus 103 and capable of operating the functions of the image forming apparatus 103, the authentication setting adapted to a use environment of a user is selectively set, and the sheet list screen is controlled according to the authentication setting. With this, it is possible to improve the convenience when the user operates a function, restricted in use, of the image forming apparatus 103, from the print control apparatus 102.

Note that considering the convenience of the sheet management application, it is also possible to define and operate a function to be restricted in use, an operation to be performed at the time of re-authentication, and so forth, independently of the image forming apparatus 103.

Next, a description will be given of a second embodiment of the present invention. In the above-described first embodiment, the description is given of the control performed when an operation requiring authentication is performed on the sheet list screen 1300 of the sheet management application. On the other hand, in the second embodiment, authentication control on a sheet feeder screen 1900 (see FIG. 19A), displayed when one of the sheet feeder buttons 410 to 417, appearing in FIG. 4, is pressed will be described. Note that the print system 100, the image forming apparatus 103, and the print control apparatus 102 according to the second embodiment are the same in configuration as those of the first embodiment, and hence description thereof is omitted.

The following description is given of operations, as characteristic features of the second embodiment, of the sheet management application performed in a case where a user has selected one of the first to third options 911 to 913 on the administrator authentication field of the tab screen of the administrator setting tab 910b shown in FIG. 9C.

First, a description will be given of an operation of the sheet management application performed when a user operation of a function, restricted in use, of the image forming apparatus 103, is performed, in a case where the first option 911 has been selected, i.e. in a case where the first authentication for requiring authentication of the system administrator has been set.

Figure 19B:
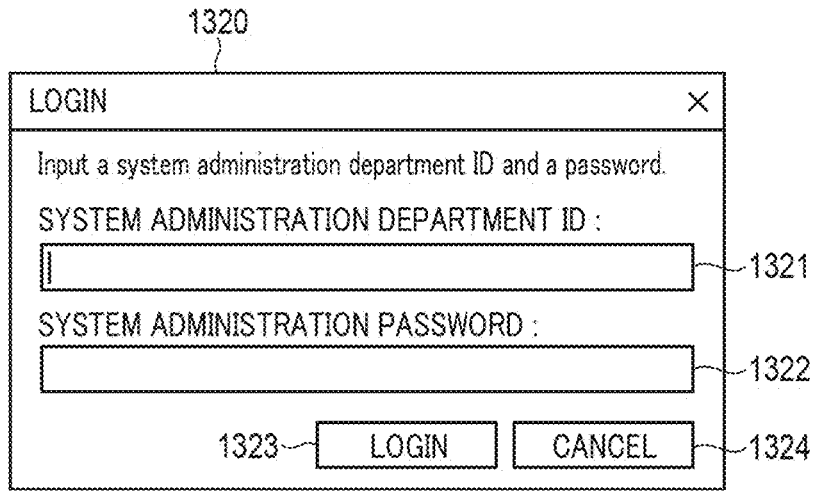
Figure 19C:
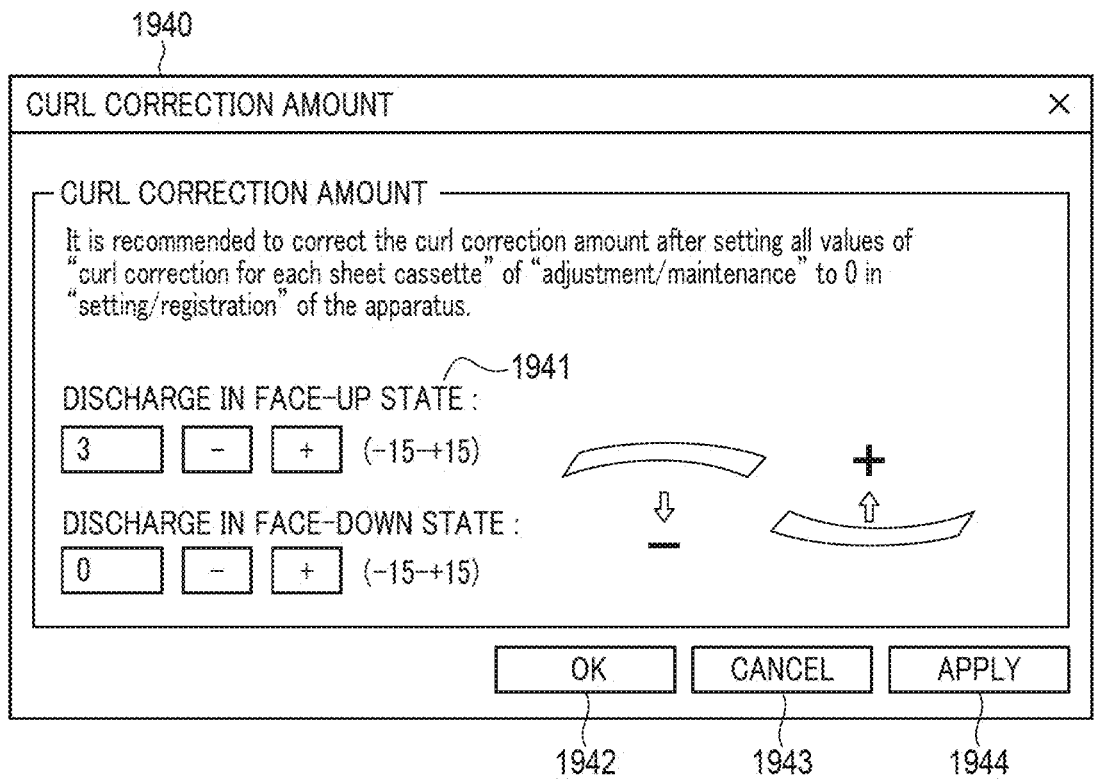

FIGS. 19A to 19C are diagrams useful in explaining changes of the screen when an adjustment button 1903 is pressed on the sheet feeder screen 1900 displayed by pressing the sheet feeder button 411 on the top screen 400 of the sheet management application in the case where the first authentication setting has been set.

FIG. 19A shows the sheet feeder screen 1900. More specifically, this screen is displayed when the CRTC 312 draws image data in the video memory according to an instruction from the CPU 301 and outputs this data to the display device 113 as video signals.

The sheet feeder screen 1900 includes a sheet list display area 1901, a sheet information display area 1902, the adjustment buttons 1903 each for outputting an adjustment screen for an associated adjustment item, and a detailed adjustment button 1904 for displaying a setting screen of other sheet information not displayed here. Further, the sheet feeder screen 1900 includes an OK button 1905, a cancel button 1906, a pull-down menu 1907 for selecting a display method of the sheet list, and a sheet search input area 1908.

The sheet list display area 1901 displays the same contents as those of the sheet list display area 1301 on the sheet list screen 1300, described in the first embodiment, and hence detailed description thereof is omitted. When the sheet feeder screen 1900 is displayed, a sheet set for the sheet feed section 116-1 is selected on the sheet list display area 1901. When a sheet is selected from the sheet list display area 1901, the information of the selected sheet is displayed on the sheet information display area 1902. Here, when a user selects another sheet on the sheet list display area 1901 and presses the OK button 1905, the controller 300 (CPU 301) sets the other sheet selected by the user, for the image forming apparatus 103. Further, when the user selects another sheet on the sheet list display area 1901 and presses the cancel button 1906, the controller 300 closes the sheet feeder screen 1900 without setting the other sheet selected by the user, for the image forming apparatus 103.

The sheet information display area 1902 displays the setting information of a sheet, being currently selected. For example, when the sheet feeder button 411 on the top screen 400 shown in FIG. 4 is pressed to display the sheet feeder screen 1900, the sheet information display area 1902 displays the information on the sheet assigned to the sheet feed section 116-1 at that time.

Next, items on the sheet information display area 1902 will be described.

To improve the convenience of a user, in the second embodiment, only the sheet information, frequently used by a user, is displayed as the items of the sheet information display area 1902, for example. More specifically, the sheet information display area 1902 includes the name of a sheet being currently selected and the various adjustment items of this sheet (image position adjustment, secondary transfer voltage adjustment, curl correction amount, gloss/black grade adjustment, trailing end white void correction, saddle-stitch setting, and adjustment of quantity of air supplied by a sheet fan). Further, description indicating whether or not the adjustment value has been changed from the initial value of the image forming apparatus 103 is added to each of the various adjustment items. More specifically, "not adjusted" is added to an adjustment item whose adjustment value has not been changed, and "adjusted" is added to an adjustment item whose adjustment value has been changed. Further, an adjustment button is displayed for each of adjustment items which can be adjusted from the print control apparatus 102, so as to make it possible to display, when the adjustment button is pressed, an adjustment screen for adjusting the adjustment value of the corresponding item. For example, in a case where the adjustment button 1903 for the curl correction amount is pressed, an adjustment screen 1940 for the curl correction amount, shown in FIG. 19C, is displayed.

The detailed adjustment button 1904 is pressed when a user desires to check setting information items of the sheet being currently selected, which are not displayed on the sheet information display area 1902, and change a setting of any of the setting information items.

The pull-down menu 1907 is for selecting one of the display methods of the sheet list display area 1901, and is the same as the pull-down menu 1302, appearing in FIG. 13A, and hence description thereof is omitted.

The search input area 1908 is the same as the search input area 1303, appearing in FIG. 13A, and hence description thereof is omitted.

The adjustment button 1903 is a button to be pressed for editing the sheet information. Therefore, when the adjustment button 1903 is pressed, the authentication screen 1320, shown in FIG. 19B, is displayed to prompt the user to perform authentication. Details of the screen display-switching process after the adjustment button 1903 is pressed (clicked) is the same as the process in FIG. 17, and hence description thereof is omitted. Further, the authentication screen 1320 is the same as the authentication screen 1320, shown in FIG. 13B, and hence description thereof is omitted.

Next, the adjustment screen 1940 for curl correction, shown in FIG. 19C, will be described.

The adjustment screen 1940 is displayed when the CRTC 312 draws image data in the video memory according to an instruction from the CPU 301, and outputs this image data, drawn in the video memory, to the display device 113 as video signals.

The adjustment screen 1940 has a controller 1941 for changing a curl correction amount for sheets to be discharged in a face-up state and a curl correction amount for sheets to be discharged in a face-down state. Further, the adjustment screen 1940 has an OK button 1942, a cancel button 1943, and an application button 1944.

The application button 1944 may be grayed out so as to disable clicking until the curl correction amount is changed.

When the OK button 1942 or the application button 1944 is clicked, the controller 300 (CPU 301) writes information (curl correction amount displayed on the adjustment screen 1940) of a sheet being currently selected, into the sheet settings management table 701. Then, the controller 300 transmits a sheet setting instruction for registering the information of the sheet settings management table 701, corresponding to the sheet being currently selected, in association with the sheet feed section 116-1, to the image forming apparatus 103.

On the other hand, in a case where the cancel button 1943 is clicked, the controller 300 closes the adjustment screen 1940 without editing the information of the sheet being currently selected.

Next, a description will be given of an operation of the sheet management application performed when the second option 912 has been selected by the user, i.e. when the second authentication setting for permitting use of a function, restricted in use, of the image forming apparatus 103, without authentication has been set.

In a case where the sheet feeder button 411 of the sheet feed section 116-1, on the top screen 400, shown in FIG. 4, is pressed when the second authentication setting has been set, similar to the case where the first authentication setting has been set, the sheet management application displays the sheet feeder screen 1900 shown in FIG. 19A.

However, even when one of the adjustment buttons on the sheet feeder screen 1900 is pressed, differently from the case where the first authentication setting has been set, the corresponding adjustment screen is directly displayed without displaying the authentication screen 1320 shown in FIG. 19B. That is, for example, when the adjustment button 1903 on the sheet feeder screen 1900 is pressed, the adjustment screen 1940 shown in FIG. 19C is directly displayed without displaying the authentication screen 1320. Note that the screen display-switching process after pressing (clicking) of the adjustment button 1903 is the same as the process in FIG. 17, and hence description thereof is omitted. Thus, in the case where the second authentication setting ("not use authentication when performing sheet adjustment") has been set, the user is permitted to operate the adjustment screen 1940 for curl correction without performing authentication.

Next, a description will be given of an operation of the sheet management application performed when the third option 913 has been selected by the user, i.e. when the third authentication setting for indiscriminately disabling setting of a function, restricted in use, of the image forming apparatus 103, has been set.

FIG. 20 is a diagram showing a sheet feeder screen 2000 displayed by pressing the sheet feeder button 411 on the top screen 400 of the sheet management application in the case where the third authentication setting has been set.

More specifically, the sheet feeder screen 2000 is displayed when the CRTC 312 draws image data in the video memory according to an instruction from the CPU 301, and outputs this image data, drawn in the video memory, to the display device 113 as video signals.

The screen configuration of the sheet feeder screen 2000 is the same as that of the sheet feeder screen 1900 shown in FIG. 19A, and hence description thereof is omitted. In the case where the third authentication setting ("disable setting of adjustment items requiring authentication") has been set, the adjustment buttons of the sheet information in an area 2001 are grayed out to prevent the user from setting an adjustment item requiring authentication. With this, it is possible to prevent a user not having the use authority with respect to a function, restricted in use, of the image forming apparatus 103, from erroneously instructing an unauthorized operation. Further, it is possible to eliminate troublesomeness caused when the authentication screen 1320, shown in FIG. 19B, is displayed in a case where the user erroneously instructs an unauthorized operation.

As described above, according to the second embodiment, similar to the sheet list screen, the sheet feeder screen displayed when one of the sheet feeder buttons 410 to 417 is pressed on the top screen 400 is also controlled according to the authentication setting adapted to the use environment of a user. That is, as described in the first and second embodiments, the screen control according to the authentication setting of the sheet management application can be applied to any operation on the screen.

Note that although in the first and second embodiments, the multi-function peripheral of the present invention is the image forming apparatus 103, the multi-function peripheral may be, for example, an apparatus having multiple functions and capable of controlling use of some of its functions, such as a smartphone and a tablet. Similarly, although in the first and second embodiments, the information processing apparatus of the present invention is the print control apparatus 102, the information processing apparatus is not limited to an apparatus associated with print control, insofar as it is an apparatus configured such that the screen of an application that performs an operation associated with the functions of the multi-function peripheral is controlled according to the authentication setting set in advance.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-067705 filed Mar. 29, 2019, which is hereby incorporated by reference herein in its entirety.

What is claimed is:

1. An information processing system including an image processing apparatus and an information processing apparatus that manages functions of the image processing apparatus, the image processing apparatus and the information processing apparatus being capable of communicating with each other,
wherein the image processing apparatus comprises:
an authentication controller that executes an authentication process for receiving authentication information from the information processing apparatus, and performing authentication based on the received authentication information, and
wherein the information processing apparatus comprises:
a display that displays an operation screen including a predetermined operation item requiring the authentication process; and
a controller that:
causes, in a case where a first setting for executing the authentication process when the predetermined operation item is selected has been set in the information processing apparatus, the display to display an authentication screen when the predetermined operation item is selected, and executes a transmitting process for transmitting authentication information received via the displayed authentication screen to the image processing apparatus; and
causes, in a case where a second setting for disabling the predetermined operation item has been set in the information processing apparatus, the display to display the operation screen so that an operator can recognize that the predetermined operation item is not able to be selected.

2. The information processing system according to claim 1, wherein the display displays an authentication setting selection screen for receiving at least one of the first setting and the second setting.

3. The information processing system according to claim 1, wherein the authentication information includes an ID and a password of an administrator.

4. The information processing system according to claim 1, wherein the predetermined operation item is an operation item regarding sheet information of a sheet on which an image is printed by the image processing apparatus.

5. The information processing system according to claim 1, wherein, in a case where a third setting for permitting use of all functions of the image processing apparatus without requiring the authentication process has been set in the information processing apparatus, the controller causes the display to display the operation screen so that an operator can recognize that the predetermined operation item is able to be selected.

6. The information processing system according to claim 1, wherein the controller further causes, in the case where the first setting for executing the authentication process when the predetermined operation item is selected has been set in the information processing apparatus, the display to display the operation screen so that an operator can recognize that the predetermined operation item is able to be selected.

7. The information processing system according to claim 1, wherein the controller causes, in a case where the second setting for disabling the predetermined operation item has been set in the information processing apparatus, the display to display the operation screen in a state that an object about the predetermined operation item is grayed out.

8. The information processing system according to claim 1, wherein the controller causes, in a case where the second setting for disabling the predetermined operation item has been set in the information processing apparatus, the display to display the operation screen in a state that an object about the predetermined operation item is not displayed.

9. An information processing apparatus that is capable of communicating with an image processing apparatus and manages functions of the image processing apparatus, comprising:
an authentication controller that sends an inquiry about authentication information to the image processing apparatus to cause the image processing apparatus to execute an authentication process;
a display that displays an operation screen including a predetermined operation item requiring the authentication process; and
a controller that:
causes, in a case where a first setting for executing the authentication process when the predetermined operation item is selected has been set in the information processing apparatus, the display to display an authentication screen when the predetermined operation item is selected, and executes a transmitting process for transmitting authentication information received via the displayed authentication screen to the image processing apparatus; and
causes, in a case where a second setting for disabling the predetermined operation item has been set in the information processing apparatus, the display to display the operation screen so that an operator can recognize that the predetermined operation item is not able to be selected.

10. A method of controlling an information processing system including an image processing apparatus and an information processing apparatus that manages functions of the image processing apparatus, the image processing apparatus and the information processing apparatus being capable of communicating with each other, the method comprising:

causing the image processing apparatus to execute an authentication process for receiving authentication information from the information processing apparatus, and performing authentication based on the received authentication information; and causing the information processing apparatus to:
display, on a display, an operation screen including a predetermined operation item requiring the authentication process;
in a case where a first setting for executing the authentication process when the predetermined operation item is selected has been set in the information processing apparatus, display, an authentication screen when the predetermined operation item is selected, and execute a transmitting process for transmitting authentication information received via the displayed authentication screen to the image processing apparatus; and
in a case where a second setting for disabling the predetermined operation item has been set in the information processing apparatus, display the operation screen so that an operator can recognize that the predetermined operation item is not able to be selected.

11. A method of controlling an information processing apparatus that is capable of communicating with an image processing apparatus and manages functions of the image processing apparatus, the method comprising:

causing the image processing apparatus to execute an authentication process by sending an inquiry about authentication information to the image processing apparatus;

displaying, on a display, an operation screen including a predetermined operation item requiring the authentication process;

displaying, in a case where a first setting for executing the authentication process when the predetermined operation item is selected has been set in the information processing apparatus, an authentication screen when the predetermined operation item is selected, and executing a transmitting process for transmitting authentication information received via the displayed authentication screen to the image processing apparatus;
and
displaying, in a case where a second setting for disabling the predetermined operation item has been set in the information processing apparatus, the operation screen so that an operator can recognize that the predetermined operation item is not able to be selected.

12. A non-transitory computer-readable storage medium storing a computer-executable program for executing a method of controlling an information processing apparatus that is capable of communicating with an image processing apparatus and manages functions of the image processing apparatus, the method comprising:

causing the image processing apparatus to execute an authentication process by sending an inquiry about authentication information to the image processing apparatus;

displaying, on a display, an operation screen including a predetermined operation item requiring the authentication process;

displaying, in a case where a first setting for executing the authentication process when the predetermined operation item is selected has been set in the information processing apparatus, an authentication screen when the predetermined operation item is selected, and executing a transmitting process for transmitting authentication information received via the displayed authentication screen to the image processing apparatus;
and
displaying, in a case where a second setting for disabling the predetermined operation item has been set in the information processing apparatus, the operation screen so that an operator can recognize that the predetermined operation item is not able to be selected.

* * * * *